(12) United States Patent
Lejeune et al.

(10) Patent No.: US 6,648,394 B2
(45) Date of Patent: Nov. 18, 2003

(54) VEHICLE SEAT UNDERFRAME, SEAT COMPRISING SUCH AN UNDERFRAME AND SEAT ASSEMBLY COMPRISING SUCH A SEAT

(75) Inventors: Jean-Michel Lejeune, Ascheres le Marche (FR); Pascal Guinard, Montbuy (FR)

(73) Assignee: Faurecia Sieges d'Automobile S.A., Nanterre (FR)

(*) Notice: Subject to any disclaimer, the term of this patent is extended or adjusted under 35 U.S.C. 154(b) by 0 days.

(21) Appl. No.: 10/227,918

(22) Filed: Aug. 26, 2002

(65) Prior Publication Data

US 2003/0047977 A1 Mar. 13, 2003

(30) Foreign Application Priority Data

Sep. 7, 2001 (FR) .............................. 01 11599

(51) Int. Cl.[7] ................................. B60N 2/07
(52) U.S. Cl. .................. 296/65.13; 296/63; 248/429
(58) Field of Search ................ 296/63, 65.01, 296/65.03, 65.11, 65.13; 248/419, 423, 429

(56) References Cited

U.S. PATENT DOCUMENTS

| | | | | | |
|---|---|---|---|---|---|
| 5,280,987 A | * | 1/1994 | Miller | .................. | 296/65.03 |
| 5,372,398 A | * | 12/1994 | Aneiros et al. | .......... | 296/65.03 |
| 5,562,322 A | * | 10/1996 | Christoffel | .............. | 296/65.03 |
| 5,740,999 A | * | 4/1998 | Yamada | .................. | 248/429 |
| 5,785,387 A | * | 7/1998 | Hernandez et al. | ......... | 297/473 |
| 6,152,515 A | * | 11/2000 | Wieclawski | .............. | 296/65.03 |
| 6,161,890 A | * | 12/2000 | Pesta et al. | .............. | 296/65.01 |
| 6,357,814 B1 | | 3/2002 | Boisset et al. | | |
| 6,405,988 B1 | * | 6/2002 | Taylor et al. | ............... | 248/429 |
| 6,488,249 B1 | * | 12/2002 | Girardi et al. | .............. | 248/429 |
| 6,520,581 B1 | * | 2/2003 | Tame | ......................... | 297/336 |

FOREIGN PATENT DOCUMENTS

| | | |
|---|---|---|
| EP | 0925996 A1 | 12/1998 |
| EP | 0949111 A1 | 4/1999 |
| EP | 0947380 | 10/1999 |
| FR | 2785240 A1 * | 5/2000 |
| FR | 2793454 | 11/2000 |

OTHER PUBLICATIONS

International Search Report dated May 8, 2002, Appl. No. FR 0111599.

* cited by examiner

Primary Examiner—Peter M. Cuomo
Assistant Examiner—Joe Edell
(74) Attorney, Agent, or Firm—McCracken & Frank

(57) ABSTRACT

Vehicle seat underframe comprising a framework provided with a lower guide shoe and with a moving catch comprising a lateral claw that can move between a locked position and a retracted position. The device for operating the catch is connected to a release cam which normally holds a release finger in the effaced position. When the catch is in the retracted position, the release finger moves into an active position in which a lower end of this finger projects downwards with respect to the framework while an upper end of the release finger immobilizes the release cam.

28 Claims, 20 Drawing Sheets

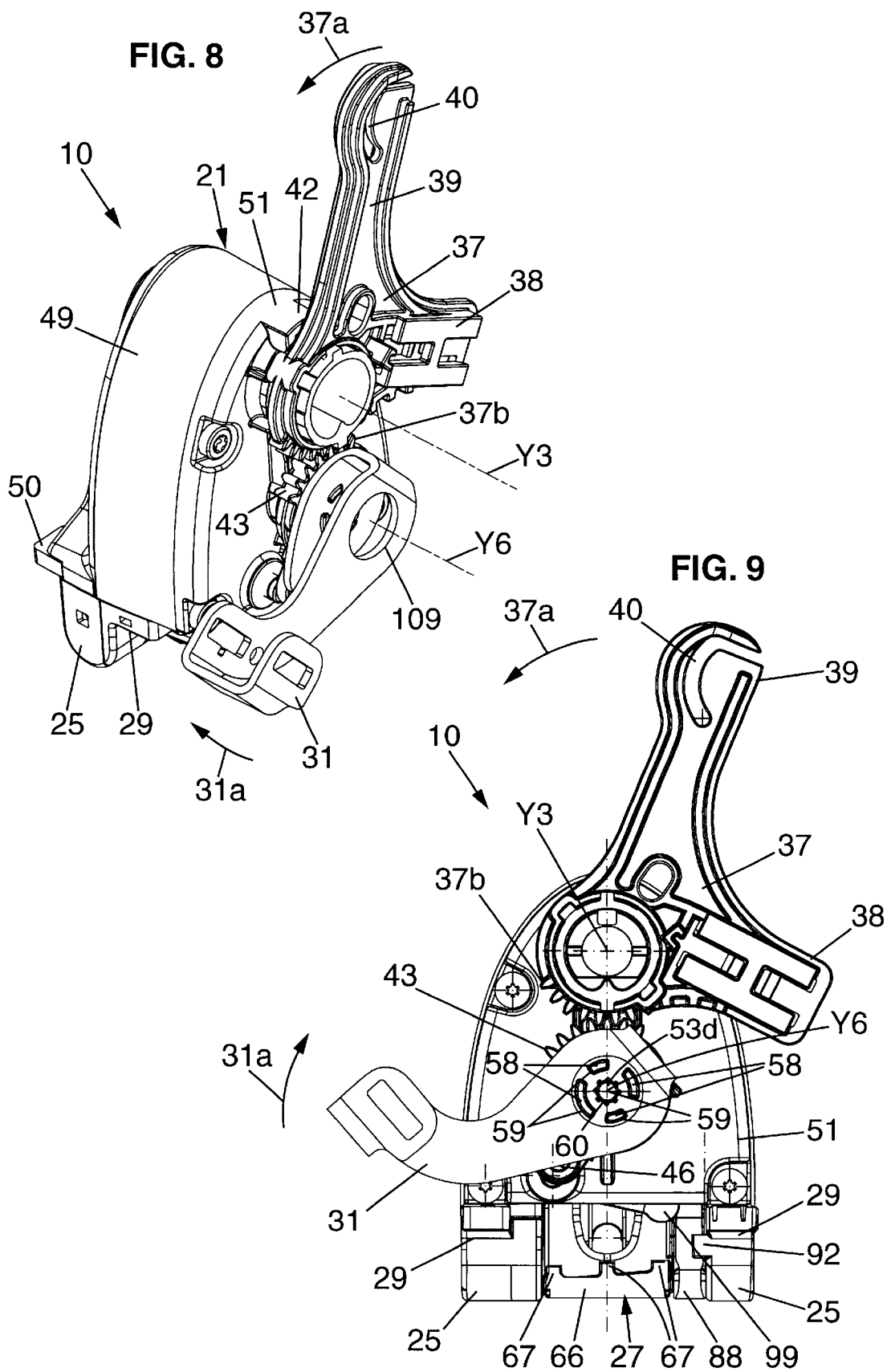

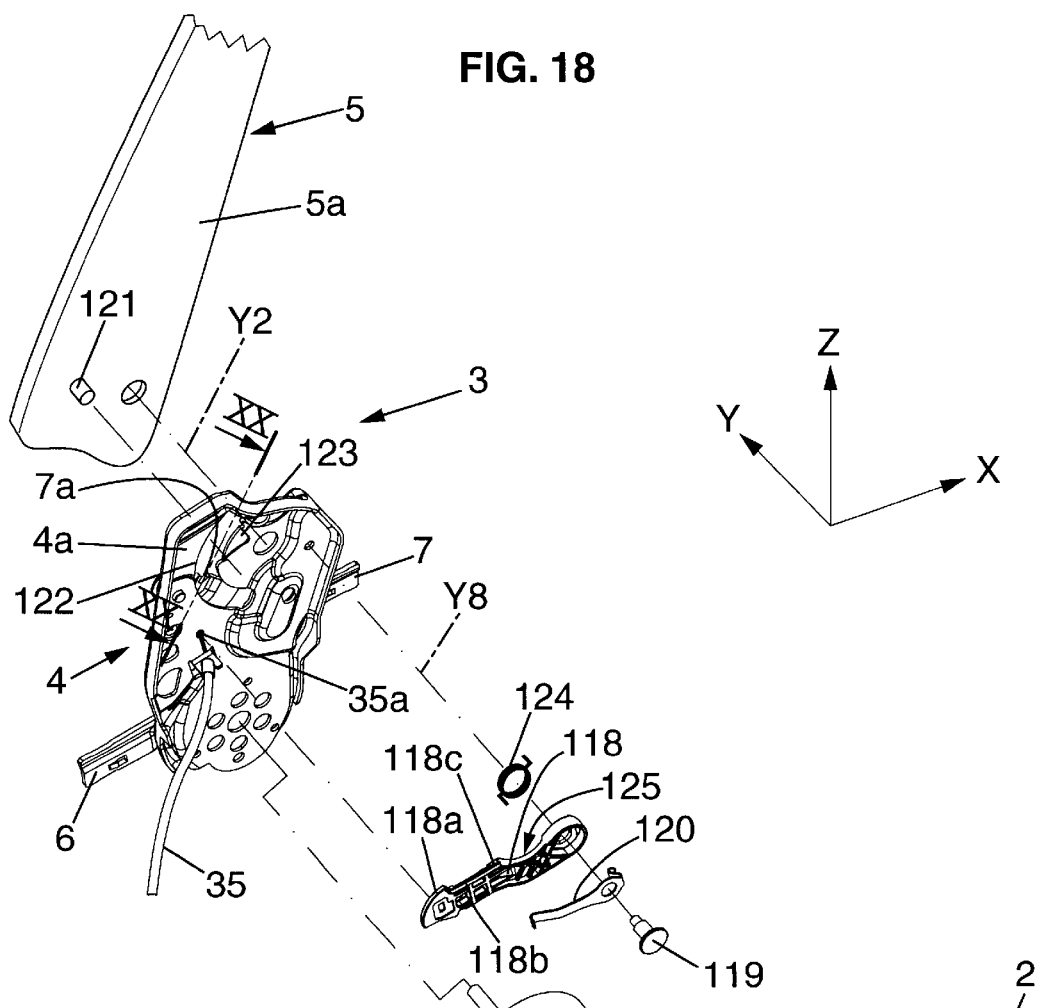
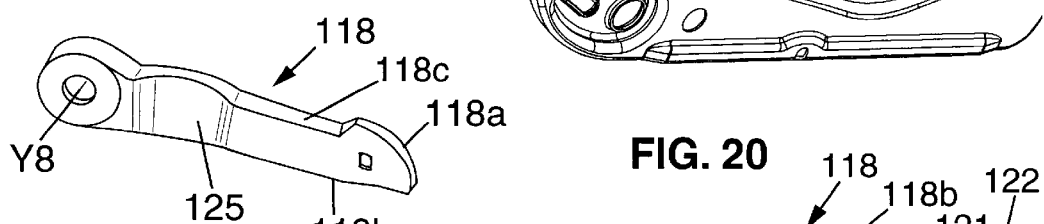
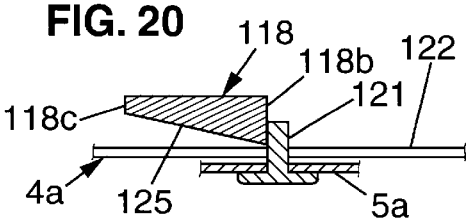

VEHICLE SEAT UNDERFRAME, SEAT COMPRISING SUCH AN UNDERFRAME AND SEAT ASSEMBLY COMPRISING SUCH A SEAT

FIELD OF THE INVENTION

The present invention relates to vehicle seat underframes, to seats comprising such underframes and to seat assemblies comprising such seats.

BACKGROUND OF THE INVENTION

More specifically, the invention relates to a vehicle seat underframe comprising:
- a rigid framework intended to be fixed to a seat part of a seat and to be mounted to slide in a longitudinal direction on a horizontal rail fixed to the floor of a vehicle, this framework comprising at least one lower guide shoe which projects downwards and which is intended to engage with a longitudinal guide belonging to the said rail,
- at least one moving catch which comprises a rigid body stretching between an upper end and a lower end, the lower end of the body of the catch being extended laterally by a projecting claw which extends at the level of the guide shoe in a transverse horizontal direction perpendicular to the said longitudinal direction, the catch being movable with respect to the rigid framework between at least two positions:
  - a locked position in which the claw of the said catch projects laterally with respect to the guide shoe in the said transverse direction, the claw of the catch then being intended to engage under a rim exhibited by the said rail in such a way as thus to prevent the seat from being removed from this rail, the catch being urged elastically towards its locked position,
  - and a retracted position in which the claw is moved towards the guide shoe with respect to the locked position, the claw then being intended no longer to interfere with the said rim of the rail and thus to allow the underframe to be removed from this rail,
- and an operating device designed to move the catch at least between its locked position and its retracted position, the operating device comprising at least one actuating member which is movable between first and second positions corresponding respectively to the locked position and to the retracted position of the catch.

Document EP-A-0 925 996 describes an example of such a seat, which is entirely satisfactory.

OBJECTS AND SUMMARY OF THE INVENTION

It is a particular object of the present invention to improve seats of the kind in question still further.

To this end, according to the invention, a seat of the kind in question is characterized in that the operating device further comprises a release finger constituting a separate part from the catch, this release finger being mounted to pivot with respect to the framework of the underframe about a release finger pivot, the said release finger comprising a first branch which extends from the said release finger pivot as far as a free end and a second branch which extends from the said release finger pivot as far as a free end, the release finger being movable between:

- an effaced position in which the second branch of the said release finger is designed to be raised enough for the said second branch not to interfere appreciably with the rail on which the underframe is intended to be mounted,
- and an active position in which the free end of the second branch projects downwards from the framework of the underframe so that when the guide shoe of the underframe is engaged with the longitudinal guide of the rail, the rail lifts the free end of the second branch of the release finger and returns the said release finger to the effaced position, the release finger being urged elastically towards its active position, in that when the release finger is in the effaced position, the first branch of the said release finger is designed to bear against a cam surface belonging to a release cam connected to the actuating member, as long as the actuating member is not in its second position, then holding the release finger in its effaced position, and in that the release finger is designed so that when the said release finger is in its active position, the free end of the first branch of the release finger comes into abutment against an abutment face integral with the release cam, thus holding the actuating member of the operating device in its second position.

By virtue of these arrangements, when the seat to which the underframe belongs has been removed from the vehicle, it is particularly simple to fit this seat back in the vehicle. What happens is that all that is required in order to achieve this is for the guide shoes of the underframes of the seat to be inserted vertically in the rails fixed to the floor of the vehicle: the release fingers of each of the underframes then move up into their effaced position, allowing the catch of each of the underframes to return to the locked position.

In some preferred embodiments of the invention, recourse may also possibly be had to one and/or other of the following arrangements, which may possibly be used independently of the arrangements described hereinabove:

- the abutment face of the release cam is connected by a rounded portion to the cam surface of the said release cam, and the actuating member is urged elastically towards its first position by at least one spring which is powerful enough that when the free end of the first branch of the release finger comes into contact with the said rounded portion in the absence of external actuation of the actuating member, the spring urging the actuating member drives the said actuating member with the said release cam into the first position and brings the cam surface of the release cam into contact with the first branch of the release finger;
- the second branch of the release finger extends at an angle in the longitudinal direction and downwards at least when the release finger is in its active position;
- the framework of the underframe comprises two horizontal sliding shoes oriented downwards and intended to bear on a sliding surface belonging to the rail, the free end of the second branch of the release finger projecting downwards beyond the said sliding shoes when the release finger is in the active position, between these sliding shoes;
- the release cam is integral with an abutment zone against which the first branch of the release finger angularly abuts when the said release finger is in its active position;
- the release cam is integral with the actuating member, which is mounted to pivot about a first axis of rotation parallel to the transverse direction;

the release cam is integral with a pivot cam which collaborates with a first cam follower integral with the catch, the said pivot cam being designed to press against the said first cam follower by causing the catch to pivot about a pivot axle parallel to the longitudinal direction, from its locked position to its retracted position when the actuating member passes from its first position to its second position, the said catch being urged in the opposite direction by a catch spring;

the first cam follower of the catch has an upper bearing surface against which the pivot cam (85) bears to cause the catch to pivot, this upper bearing surface being laterally offset with respect to the rotation axle of the catch;

the actuating member of the operating device is secured to a locking cam and the catch is mounted to pivot on the framework of the underframe with a certain vertical play, between the locked position and a sliding position situated below the locked position, the locking cam coming to bear under a second cam follower situated towards the upper end of the body of the catch so as to hold the catch in its locked position as long as the actuating member is in an angular position lying between its first position and a third position intermediate between the first and second positions, and the said locking cam being designed to allow the catch to drop into its sliding position when the actuating member is in its third position;

the locking cam is in the form of a rigid platelet stretching in a vertical plane roughly parallel to the body of the catch, the said locking cam comprising a slot in which there is engaged a peg integral with the catch, the said slot being shaped to press against the said peg and cause the catch to drop into its sliding position when the actuating member is in an angular position between its third and second positions;

the second cam follower of the catch comprises a rim stretching downwards, the locking cam penetrating between this rim and the body of the catch at least when the catch is in the locked position;

the locking cam is in contact with the rim of the second cam follower, without clearance, when the catch is in the locked position;

the rim of the second cam follower and the locking cam are shaped to collaborate with one another via a cam effect so as to cause the catch to pivot from its retracted position into its sliding position when the actuating member pivots from its second angular position to its third angular position;

the locking cam has a chamfer which collaborates with an angled interior face belonging to the rim of the second cam follower of the catch so as to move the said catch from its retracted position to its sliding position when the actuating member pivots from its second angular position to its third angular position;

the actuating member comprises a metal shaft which is integral with the locking cam, the release cam and pivot cam being integral with a hollow shaft which is fitted over the metal shaft and which is not connected in terms of rotation directly to the said metal shaft, the hollow shaft having end tabs which collaborate by fitting-together with a first operating member that can be actuated by a user, immobilizing the said hollow shaft in terms of rotation with respect to the first operating member, the said first operating member having a notched hole into which a free end belonging to the actuating member penetrates, the said free end being crimped into the said notched hole, thereby securing the said first operating member to the metal shaft;

the actuating member is integral with a first operating member that can be actuated by a user, which allows the said actuating member to be moved between its first and second positions, the actuating member also being mechanically connected to a pinion which is in mesh with a ring of teeth secured to a second operating member that can be actuated by a user, this second operating member being movable in rotation about a second axis of rotation parallel to the first axis of rotation between a rest position and an abutment position corresponding respectively to the first and third positions of the actuating member, the second operating member coming into contact with an abutment integral with the framework of the underframe when the said second actuating member is in its abutment position, and the pinion being connected, with a certain amount of backlash, to the actuating member, so that the said actuating member can pivot from its third to its second position in a first angular direction while the second operating member remains bearing against the corresponding abutment integral with the framework of the underframe;

the pinion is urged elastically in the first angular direction so as normally to be kept bearing angularly against an abutment integral with the actuating member;

the claw of the catch has a free end provided with teeth which project upwards and which are aligned in the longitudinal direction;

there are at least three teeth on the catch, the claw of the catch stretching between a front end and a rear end, and the teeth of the said claw having heights which decrease from the front end towards the rear end of the claw;

the catch is movable downwards from its locked position into a sliding position, the underframe further comprising an abutment claw which is mounted to pivot with respect to the framework of the underframe between an active position and an effaced position, the abutment claw projecting laterally with respect to the guide shoe parallel to the claw of the catch when the said abutment claw is in the active position, the said abutment claw also being shaped to have an upper surface situated above the upper ends of all the teeth of the catch when the said catch is in the sliding position, the abutment claw being urged elastically towards its active position in which it butts angularly against an abutment member integral with the framework of the underframe, and the said abutment claw comprising a part which projects in the longitudinal direction against a face of the body of the catch situated on the opposite side to the claw of the catch, so that the said catch drives the abutment claw from its active position into its effaced position when the catch moves from its sliding position to its retracted position;

the abutment claw is shaped not to extend laterally beyond the claw of the catch at least when the catch is in the retracted position;

the framework of the underframe comprises an additional guide shoe aligned with the said guide shoe in the longitudinal direction, the catch and the abutment claw being arranged between the two guide shoes and being designed to lie roughly in line with the said guide shoes when the catch is in the retracted position;

the claw of the catch has a free end extended upwards by a rim which has a horizontal upper edge running in the longitudinal direction between two inclined ends which extend downwards one opposite the other at the front and rear ends of the claw, each of the front and rear ends of the claw being provided with a catching tooth which has a vertical stop face facing towards the said rim and an upper face arranged at an angle downwards and towards the corresponding end of the claw.

Moreover, another subject of the invention is a vehicle seat comprising a backrest and a seat part mounted on two front underframes and two rear underframes as defined hereinabove, that is to say comprising at least some of the technical characteristics described hereinabove.

Advantageously:

the actuating members of the two front underframes are joined together and the actuating members of the two rear underframes are joined together, the actuating members of the front underframes and of the rear underframes being joined together by an operating linkage;

the linkage is connected with play to the actuating members of the front and rear underframes, this play being chosen so that movement of the actuating members of the front underframes from their first to their second position gives rise to an identical movement of the actuating members of the rear underframes, whereas movement of the actuating members of the rear underframes from their first to their second position does not give rise to movement of the actuating members of the front underframes;

the operating linkage is connected to the operating member of one of the rear underframes and to the pinion of the corresponding front underframe.

Finally another subject of the invention is a vehicle seat assembly comprising a seat as defined hereinabove and two parallel rails running in the said longitudinal direction and each provided with a guide against which the guide shoes of the underframes slide and with a rim under which the claws of the catches of the underframes engage.

BRIEF DESCRIPTION OF THE DRAWINGS

Other characteristics and advantages of the invention will become apparent in the course of the description which follows of one of its embodiments, which is given by way of non-limiting example, with reference to the attached drawings.

In the drawings:

FIG. 8 is a perspective view of the underframe of FIG. 7, FIG. 9 is an elevation of the underframe of FIG. 7, viewed from inside the seat, FIG. 18 is an exploded perspective part view showing the right-hand side of the framework of the seat of FIG. 1, FIGS. 19 and 20 are detailed views showing certain parts of the framework visible in FIG. 18, FIGS. 21 and 22 are views respectively similar to FIGS. 9 and 7, in the sliding position of the front left-hand underframe, FIGS. 29 and 30 are views similar to FIG. 20, respectively at the end of the folding-forwards of the upper part of the backrest and during the lifting up of the said upper part of the backrest.

MORE DETAILED DESCRIPTION

In the various figures, the same references denote elements which are identical or similar.

Figure 1:
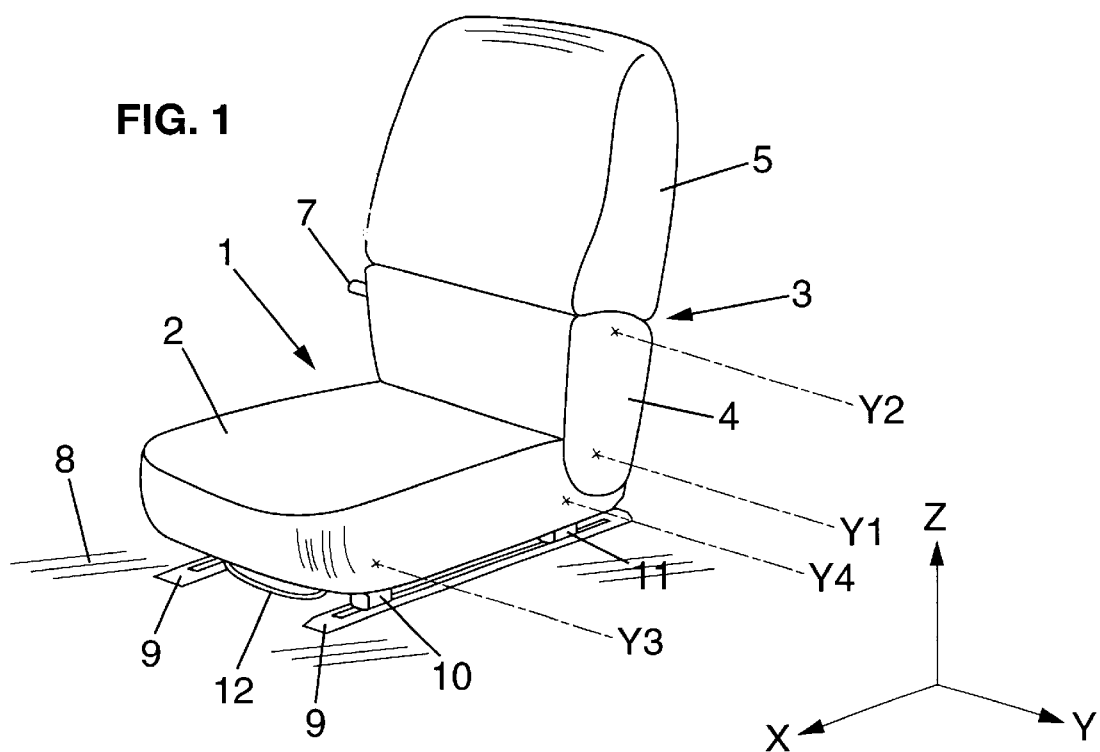
FIG. 1 is a schematic perspective view of a seat mounted to slide removably on rails, by means of underframes according to one embodiment of the invention.
Figure 2:
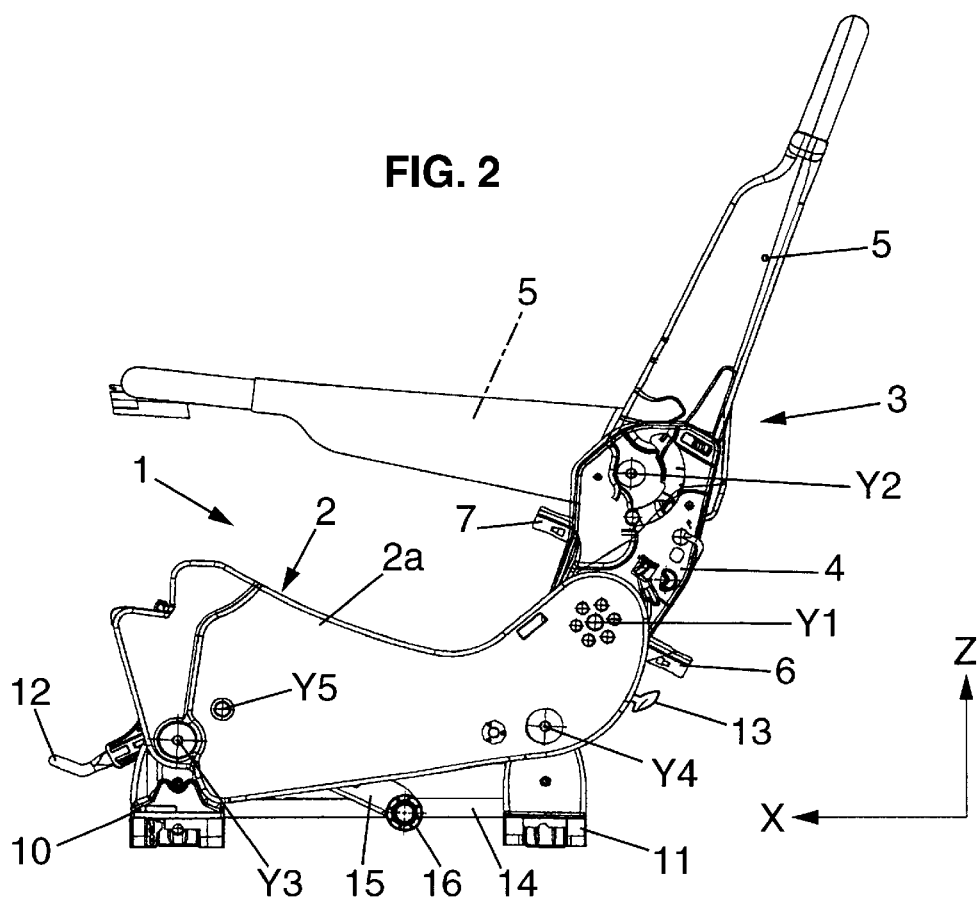
FIG. 2 is a side view of the framework of the seat of FIG. 1.

As depicted in FIGS. 1 and 2, the invention relates to a vehicle seat 1 comprising a seat part 2 on which a backrest 3 is mounted.

The backrest 3 comprises a lower part 4 which is mounted to pivot on the seat part 2 about a transverse axis of rotation Y1, by means of at least one articulation mechanism 6a (visible in FIG. 18), operated by a handle 6 or the like.

As depicted in FIGS. 1 and 2, the backrest 3 also comprises an upper part 5 which is normally locked in a roughly vertical position on the lower part 4 by means of a locking device operated by a handle 7 or the like. Actuating the handle 7 allows the upper part 5 of the backrest to be folded down about a transverse axis Y2 roughly parallel to the seat part 2, as depicted in chain line in FIG. 2.

Furthermore, the seat part 2 is mounted to slide on the floor 8 of the vehicle in a longitudinal direction X on hollow rails 9 which run in the said direction X. The seat part 2 is connected to the rails 9 by two front underframes 10 arranged one on each side of the seat and by two rear underframes 11 also arranged one on each side of the seat. The front left-hand underframe 10 and the rear left-hand underframe 11 are normally engaged and locked in the same hollow rail 9 while the front right-hand underframe 10 and the rear right-hand underframe 11 are normally engaged and locked in the other hollow rail 9, thus securing the seat 1 to the floor of the vehicle.

To adjust the longitudinal position of the seat, the user sitting in the seat can actuate catches belonging to the various underframes 10, 11 by lifting a lever handle 12, as will be described in greater detail hereinafter, which allows the underframes 10, 11 to slide in the rails 9 without allowing the underframes 10, 11 to detach from the said rails. The same sliding movement can be rendered possible for a passenger seated in another seat situated behind the seat 1, by pulling on a handle 13 (FIG. 2) fixed to the end of a strap (13a) (visible in FIG. 4), as will be described hereinafter.

As can be seen in FIG. 2, each of the underframes 10, 11 is mounted to pivot on the seat part 2 about a transverse axis Y3, Y4 respectively, situated towards the upper end of the said underframe. In addition, each front underframe 10 is connected to the rear underframe 11 situated on the same side of the seat, by means of a link rod 14 the ends of which are mounted to pivot on the two underframes 10, 11 towards the lower ends of these two underframes.

Figure 3:
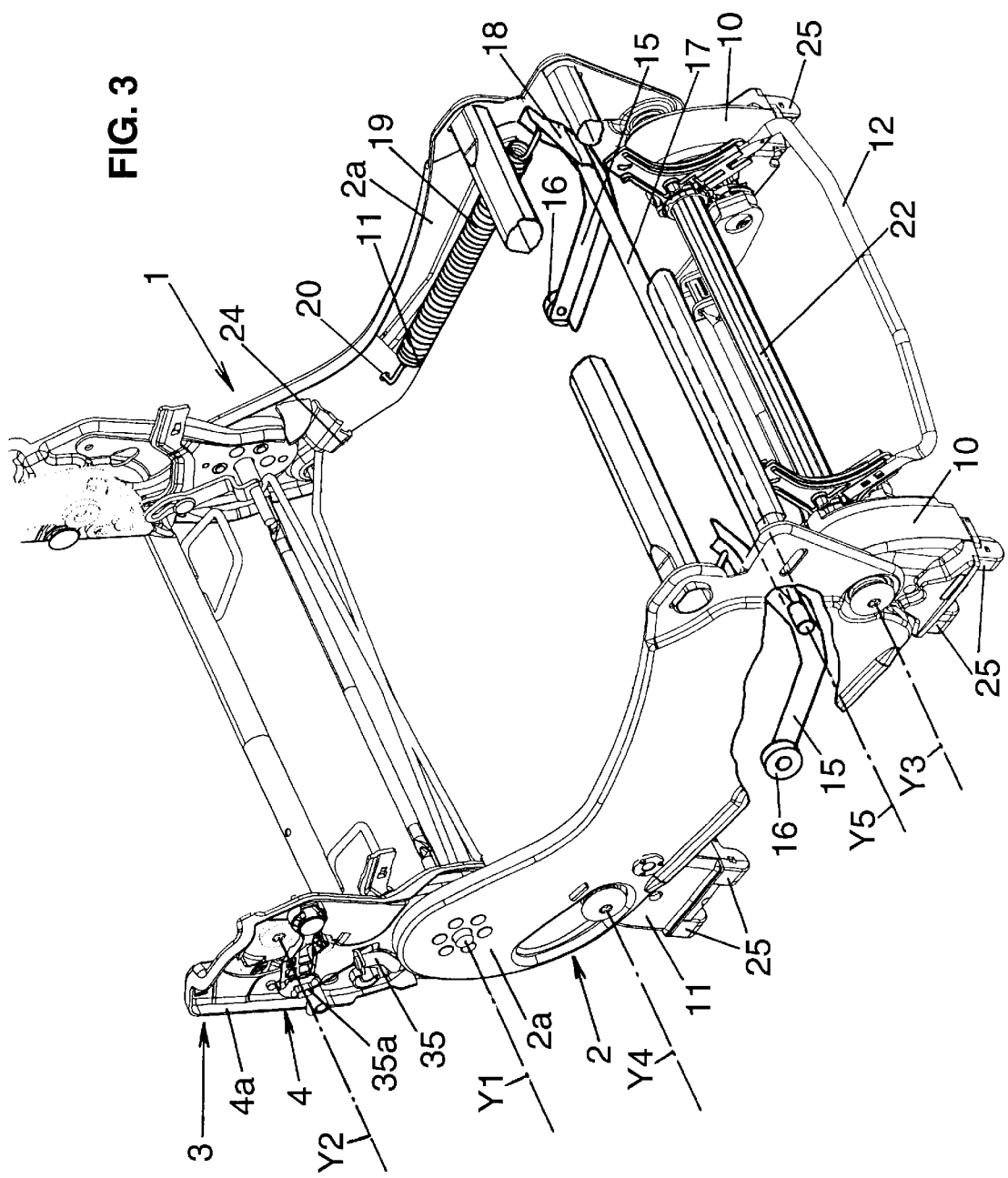
FIG. 3 is a perspective view of the framework of the seat part of the seat of FIG. 1.

In addition, as depicted in FIGS. 2 and 3, the seat part 2 comprises two lifting arms 15 each running between a lower end, at which a roller 16 which bears on the corresponding rail 9 is mounted to rotate, and an upper end, secured to a transverse connecting bar 17, which is mounted to pivot on the two metal side plates 2a of the seat part, about a transverse axis Y5 distinct from the axes Y3, Y4.

At least one of the lifting arms 15 is extended upwards by a lever arm 18 to which is attached one end of a tension spring 19, the other end of which is caught on the corresponding side plate 2a of the seat part, at a point 20.

Figure 25:
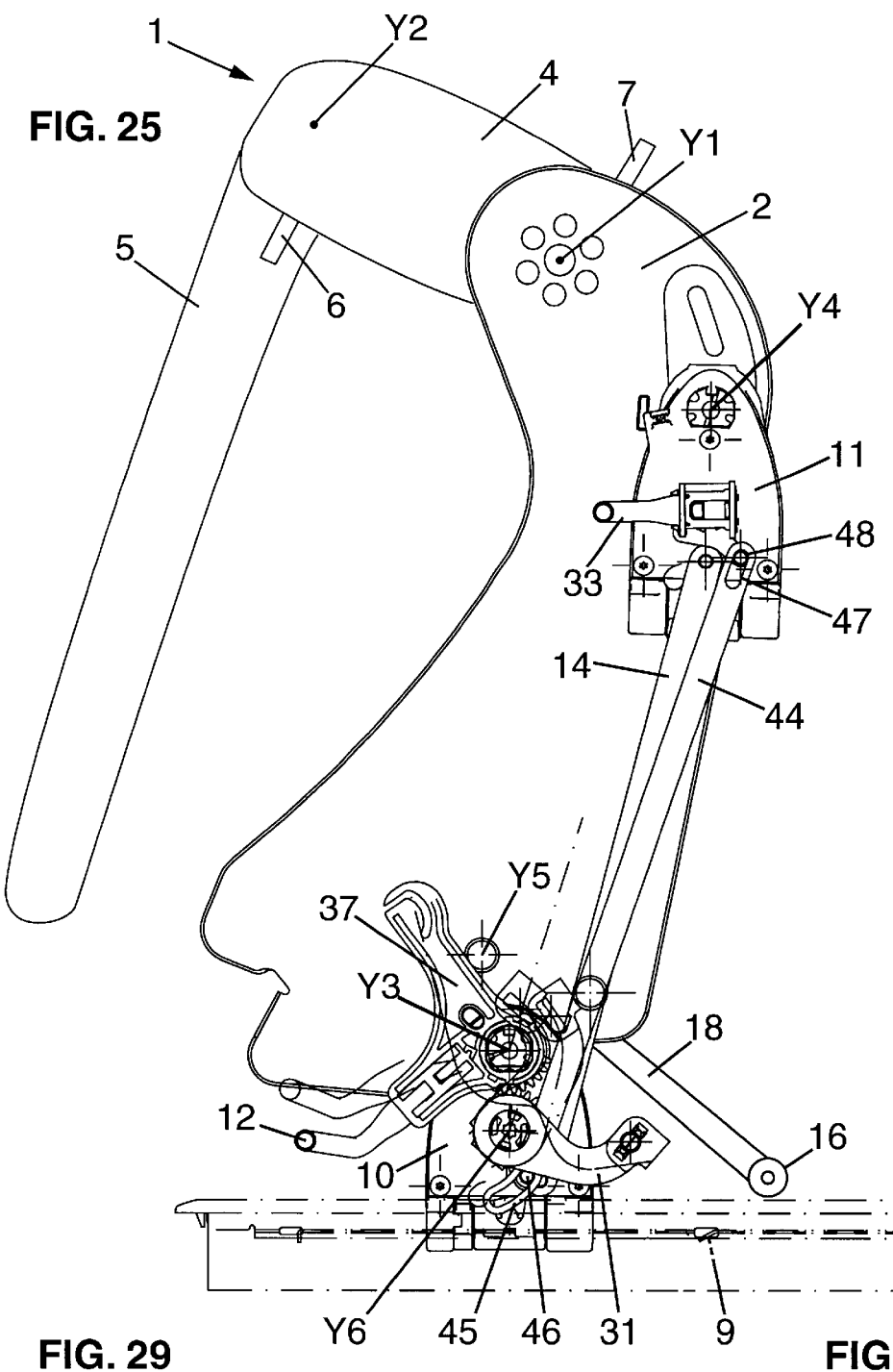
FIG. 25 is a view similar to FIG. 2, showing the seat with its seat part tipped forwards in the folded-up position.

Thus, when the upper part 5 of the backrest has been folded forward and the rear feet 11 have been unlocked so as to be able to detach from the rails 9, the rear end of the seat part 2 is lifted up under the action of the lifting arms 15 urged by the spring 19. During this movement, the seat part assembly pivots about the transverse axis Y3, and the rear feet 11 pivot in such a way as to retract into the seat part 2 under the action of the linkrods 14, as depicted in FIG. 25.

The particular set-up adopted for the lifting arms 15 makes it possible to avoid stressing the underframes 10, 11 under the action of the spring 19 and to minimize the structural deformation of the seat part imposed by the urging of the said spring 19.

Figure 4:
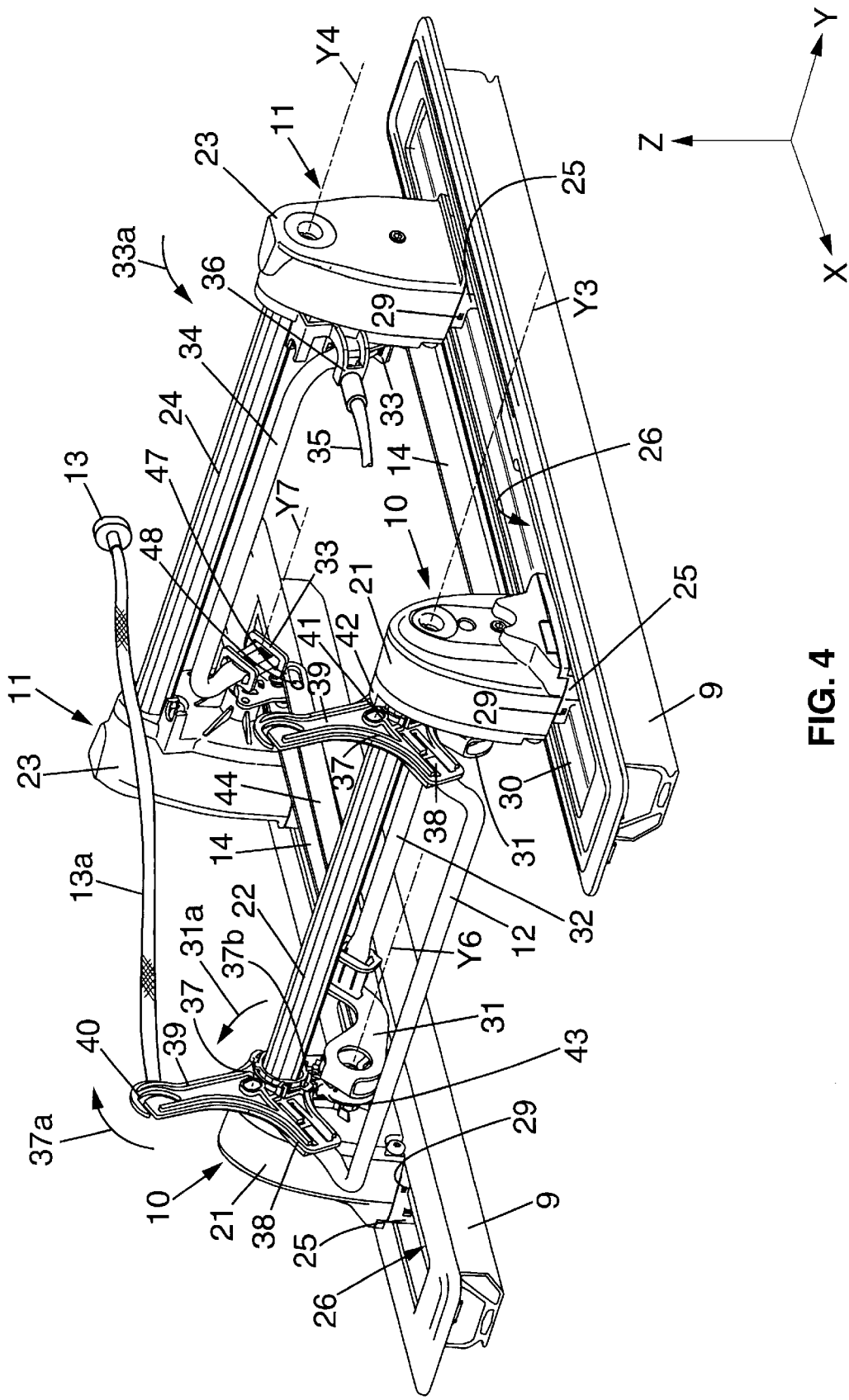
FIG. 4 is a perspective view of the underframes supporting the seat part of the seat of FIG. 1, mounted on their respective rails.
Figure 5:
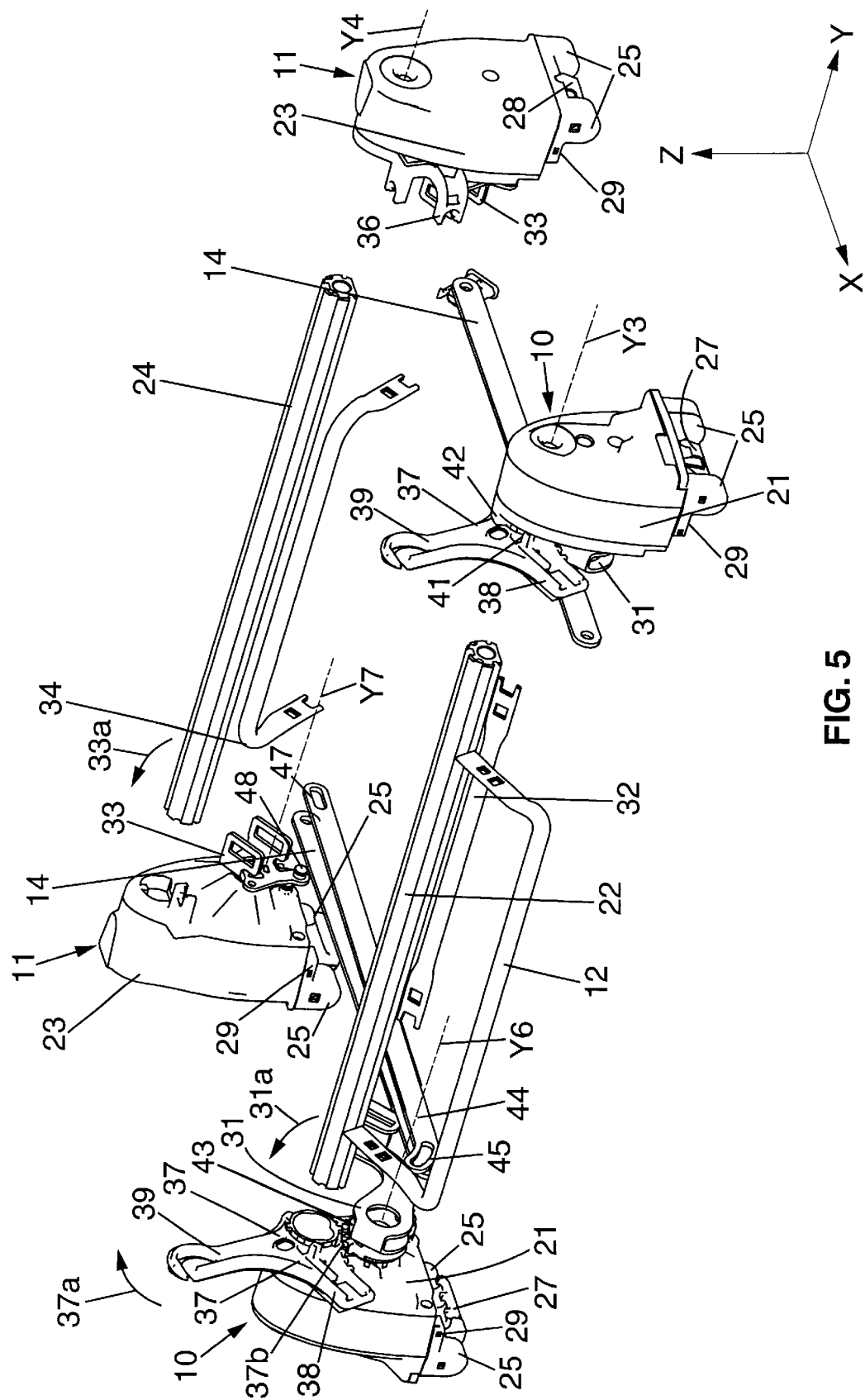
FIG. 5 is an exploded perspective view showing the underframes of the seat of FIG. 1.
Figure 6:
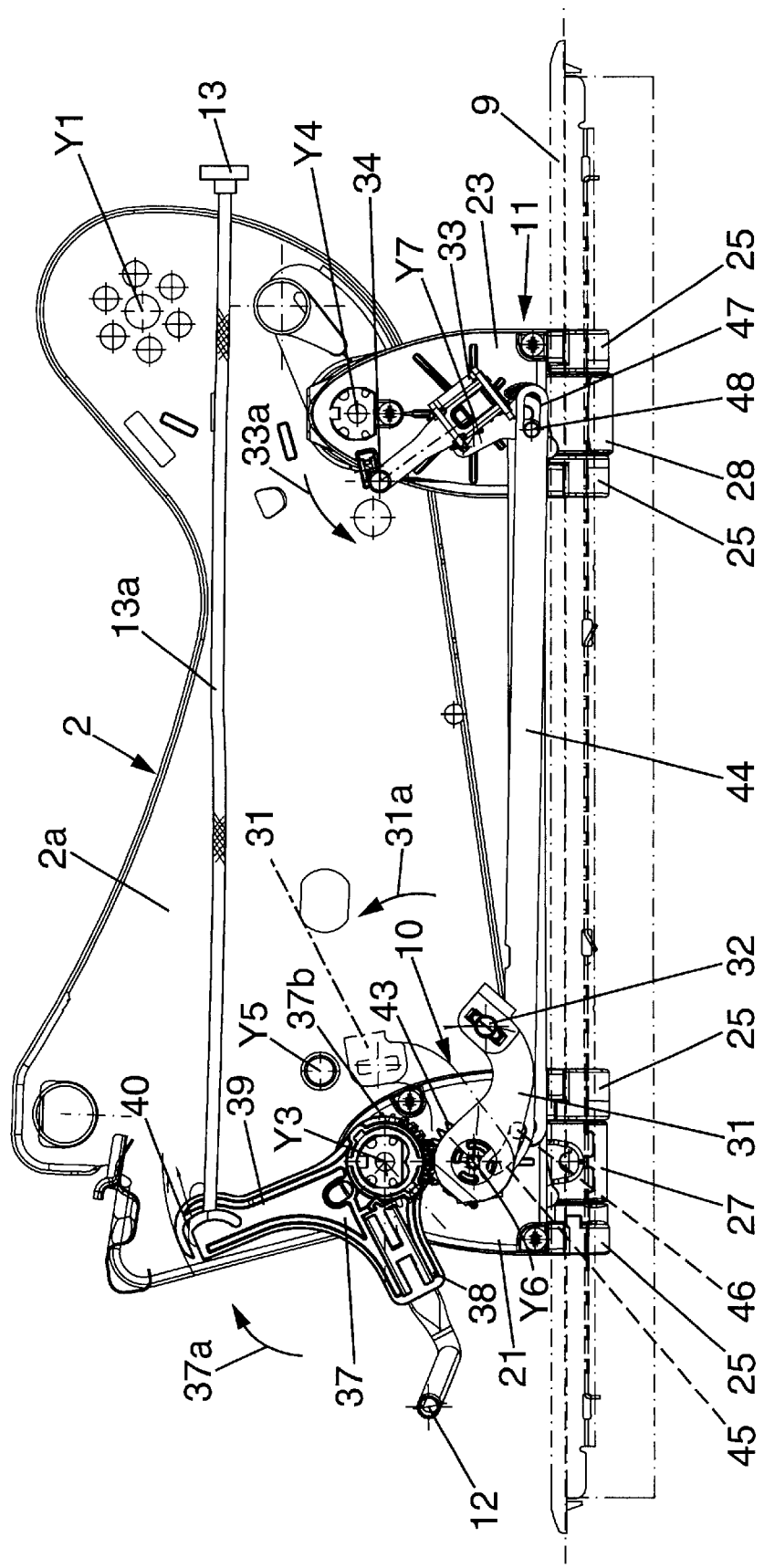
FIG. 6 is a view in cross section partially showing the inside of the seat part of the seat of FIG. 1, in a normal position of use, the section being taken on a vertical and longitudinal mid-plane.

As depicted in FIGS. 4 to 6, the two front underframes 10 respectively comprise rigid frameworks 21 which are connected to one another by a rigid transverse connecting bar 22. In the same way, the two rear underframes 11 respectively comprise rigid frameworks 23 which are connected to one another by means of a rigid transverse connecting bar 24.

In addition, each of the underframes 10, 11 comprises, in its lower part, two guide shoes 25 which project downwards and are designed to penetrate a longitudinal slot 26 made in the upper part of each of the rails 9, so as to guide the seat assembly 1 sliding in the direction X.

The two guide shoes 25 of each underframe 10, 11 are aligned with each other in the direction X and are separated from one another. A catch 27, 28 respectively, is arranged between the two guide shoes 25 of each underframe. In addition, the framework 21, 23 of each underframe 10, 11 also comprises, in its lower part, sliding shoes 29 which are each arranged to correspond with one of the guide shoes 25 and which are directed downwards so as to bear on a horizontal sliding surface 30 of the corresponding rail 9.

As a preference, the guide shoes 25 and the sliding shoes 29 of one and the same underframe 10, 11 are made as a single piece, for example by moulding of plastic.

Each of the aforementioned catches 27, 28 is movable between three positions:

a locked position in which it grips under a rim formed under the sliding surface 30 of each rail 9, completely securing the corresponding underframe 10, 11 to the said rail 9, a sliding position in which the said catch 27, 28 is lowered slightly with respect to its locked position so as no longer to interfere with the aforementioned rim of the corresponding rail, this allowing free sliding of the corresponding underframe 10, 11 along the rail 9, and a retracted position in which the catch 27, 28 moves sideways to come practically into line with the two guide shoes 25 of the corresponding underframe 10, 11 so that the corresponding underframe 10, 11 can be separated from its rail 9.

The catches 27 of the two front underframes 10 are each operated by a first operating member 31 in the form of a metal lever, which pivots about a transverse axis Y6. This first operating member 31 is movable in the direction of the arrow 31a between a first position or rest position and a second position (visible in chain line in FIG. 6) which positions correspond respectively to the locked and retracted positions of the catch of the corresponding front underframe 10.

The first operating members 31 of the two front underframes 10 are connected together by a rigid connecting bar 32, on which a user can act manually in order simultaneously to move the first operating members 31 in the two front underframes, simultaneously unlocking these two underframes.

Furthermore, the catch 28 of each of the rear underframes 11 is movable from its locked position to its retracted position by an operating member 33 also in the form of a metal lever, pivoting about a transverse axis Y7. The operating member 31 is itself movable in the direction of the arrow 33a from a first position or a rest position and a second position corresponding respectively to the locked and retracted positions of the corresponding catch 28. The operating members 33 of the two rear underframes 11 are connected together by a connecting bar 34 which forces these two catches 28 to be in the same position simultaneously.

In addition, the rigid framework 23 of one of the rear underframes 11 comprises a support tab 36 to which is fixed the sheath of a sheathed cable 35 which will be described in greater detail hereinafter and which allows the two rear underframes 11 to be unlocked simultaneously.

Furthermore, the catches 27 of the front underframes 10 are also actuated by means of a second operating member 37 mounted to pivot on each underframe 10, each of these second operating members 37 being able to adopt the form, for example, of a plastic lever mounted to pivot about the connecting bar 22, particularly about the axis Y3.

Each second operating member 37 comprises a first lever arm 38 which is normally inclined slightly forward and downwards, this first lever arm 38 being secured by fitting-together to one of the lateral branches of the balance beam 12 which may itself for example be in the form of a tube with bent and flattened ends in the overall shape of a U.

In addition, each second operating member 37 may comprise, in the example considered here, a second lever arm 39 to the end of which there may be fixed a strap 13a or the like (see FIGS. 4 and 6) connected to the aforementioned handle 13. The strap 13a is for example fixed to the lever arm 39 by a slot 40 made in this lever arm and allows a passenger of the vehicle situated behind the seat 1 to slide this seat.

Each second operating member 37 is movable in an actuating direction 37a between the rest position visible in FIGS. 4 and 5 and an actuating position in which the balance beam 12 is lifted and in which an abutment 41 of each second operating member 37 bears against an abutment 42 belonging to the framework 21 of the corresponding front underframe 10.

Finally, each second operating member 37 may advantageously have teeth 37b in the arc of a circle, centred on the axis Y3, which mesh with a pinion 43 mechanically connected to the first operating member 31, as will be explained hereinafter.

By virtue of these arrangements, pivoting the second operating members 37 in the angular direction 37a, from their rest position to their actuating position causes the first operating members 31 to pivot from their first position to a third angular position intermediate between the first and second positions defined hereinabove. In that way, the catches 27 of the two front underframes 10 can be moved from their locked position to their sliding position, intermediate between the said locked and retracted positions.

Furthermore, a transmission linkage 44 connects the pinion 43 of one of the front underframes, for example the front right-hand underframe, to the first operating member 33 of the corresponding rear underframe 11, in this instance the rear right-hand underframe.

Advantageously, this transmission linkage 44 comprises at its front end a slot roughly in the shape of an arc of a circle, stretching upwards from a rear end as far as a front end, this slot 45 accommodating a peg 46 which is secured to the pinion 43 and which is normally situated at a level lower than the axis Y6 and at the rear end of the slot 45 when the seat is in the normal position of use.

In addition, the rear end of the transmission linkage 44 is also provided with a slot 47, for example a straight slot, which runs between a rear end and a front end. A peg 48 secured to the actuating member 33 is engaged in this slot 47, this peg being situated at a level lower than the axis Y7 and at the rear end of the slot 47 when the seat is in the normal position of use (see FIGS. 5 and 6).

Thus, when a user actuates the balance beam 12 or the handle 13 to move the second operating member 37 of the front underframes in the angular direction 37a, this movement results in a pivoting of the pinions 43 and of the operating members 31 in the opposite angular direction, that is to say in the angular direction 31a, which means that the peg 46 pushes backwards the transmission linkage 44 which itself pushes backwards the peg 48. The two actuating members 33 of the rear underframes therefore pivot together in the direction 33a as far as a position corresponding to the position of sliding of the rear catches 28. The user can then slide the seat 10 freely as long as actuation of the balance beam 12 or of the handle 13 is maintained.

As depicted in FIGS. 7 to 10, the framework 21 of each front underframe 10 comprises a rigid body 49 made, for example, of aluminium, to the lower end of which there is fixed, by fitting-together, a piece 50 of plastic which forms both the two guide shoes 25 and the two sliding shoes 29.

The body 49 of the underframe 10 forms a hollow casing which contains the catch 27 and which has a face open towards the inside of the seat, which open face is covered by a cover 51 made of plastic or the like which is, for example, screwed to the body 49.

The framework 21 of the underframe 10 carries the device for operating the catch 27 of this underframe, which operating device comprises an actuating member 52 (FIG. 7) mounted to rotate about the axis Y6. This actuating member 52 is made up:

of an inner shaft 53, for example made of metal, which runs longitudinally along the axis Y6, and of a hollow outer shaft 54, made for example of plastic, which is fitted without play over a narrowed-diameter end 53a belonging to the inner shaft 53.

The other end 53b of the inner shaft 53 is mounted to rotate in a bearing 55 formed by the body 49 of the underframe, while the outer shaft 54 comprises a cylindrical part mounted to rotate in a cylindrical bearing 56 formed by the cover 51.

Near its end 53b, the inner shaft 53 further comprises a non-circular part 53c preferably forming two flats, which non-circular part 53c is fitted into the central part of a flat spiral spring 57 the outer end of which bears against the body 49 of the underframe.

Furthermore, one of the ends of the outer shaft 54 forms tabs 58 which are fitted without play into corresponding slots 59 of the first operating member 31. The said first operating member 31 also has a notched central hole 60 to which the end 53d of the metal inner shaft 53 is riveted so as to cause the material of the said shaft 53 to penetrate the notches of the hole 60, which also secures the inner shaft 53 to the first actuating member 31.

The catch 27, for its part, may advantageously be made of metal, particularly as a casting, and comprise a body 61 which runs between an upper end 62 and a lower end 63. The body 61 of the catch 27 further comprises two pivots 64 aligned in the direction X, which are mounted to pivot with a certain amount of vertical play inside the framework 21, for example between tabs 65 of the cover and similar supports (not visible in the drawings) exhibited by the body 49. The catch 27 can thus pivot about an axis parallel to the axis X and move vertically along a vertical axis Z. To allow these two movements, the body 61 of the catch 27 is also pierced with a vertical oblong hole 65 through which the aforementioned inner shaft 53 passes.

The lower end 63 of the body 61 of the catch is extended laterally in the transverse direction Y by a claw 66 which at its free end has teeth 67 projecting upwards. These teeth are arranged with a regular spacing along the claw 66.

Figure 7:
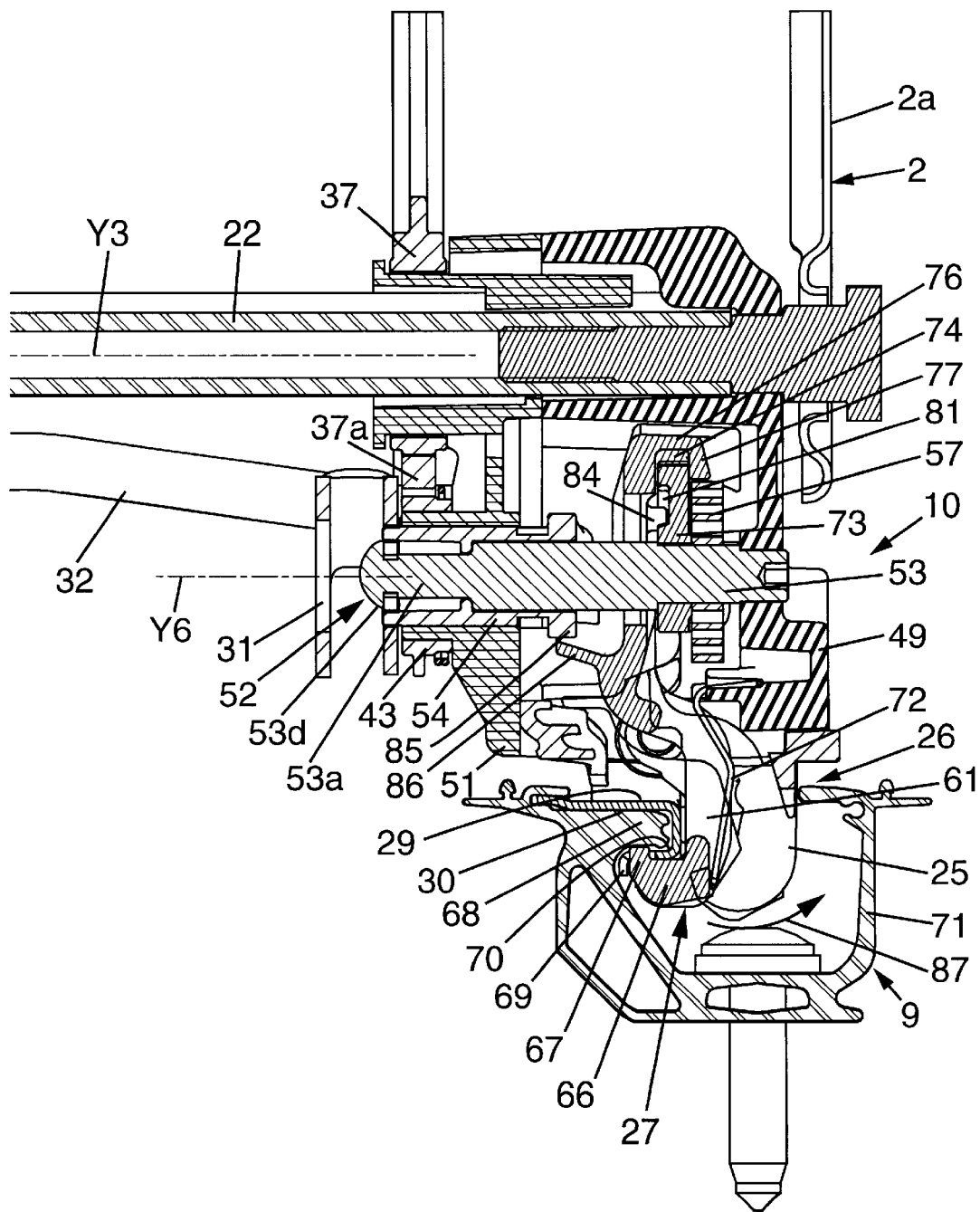
FIG. 7 is a view in vertical cross section of the front left-hand underframe of the seat of FIG. 1, locked onto its rail.

As can be seen in FIG. 7, when the underframe 10 is locked onto the corresponding rail 9, the claw 66 of the catch 27 is engaged under a rim 68 of the rail 9, this rim being arranged for example towards the inside of the seat, and the teeth 67 of the claw 66 bear under the rim 68, entering notches 69 formed under this rim with the same spacing as the teeth 67. Advantageously, the notches 69 may be pierced in a sheet metal plate 70 which covers the rim 68 of the rail 9 and is fixed to this rail, the body 71 of the rail 9 being, for example, perhaps made of light alloy.

Advantageously, the teeth 67 of the claw 66 have a height which increases from the rear end towards the front end of the said claw, so as to better guarantee that the said teeth remain engaged in the notches 69 of the corresponding rail even when the vehicle is involved in an accident, particularly a frontal impact, including when the vehicle safety belt is fixed to the seat 1.

What actually happens in this case is that the seat 1 has a tendency to tip forwards, which means that the teeth 67 situated towards the front are then less firmly engaged in the corresponding notches 69 than they are under normal conditions.

The catch 27 is normally held in this locked position by the following means:

a hairpin spring 72, one end of which is fitted into the body 49 and the other end of which rests against the lower part of the body 61 of the catch at the opposite end to the claw 66, and a metal locking cam 73 which is integral with the inner shaft 53 and the outer periphery of which has two peripheral surfaces in the shape of arcs of circles 74, 75 of larger and smaller diameters respectively.

Figure 10:
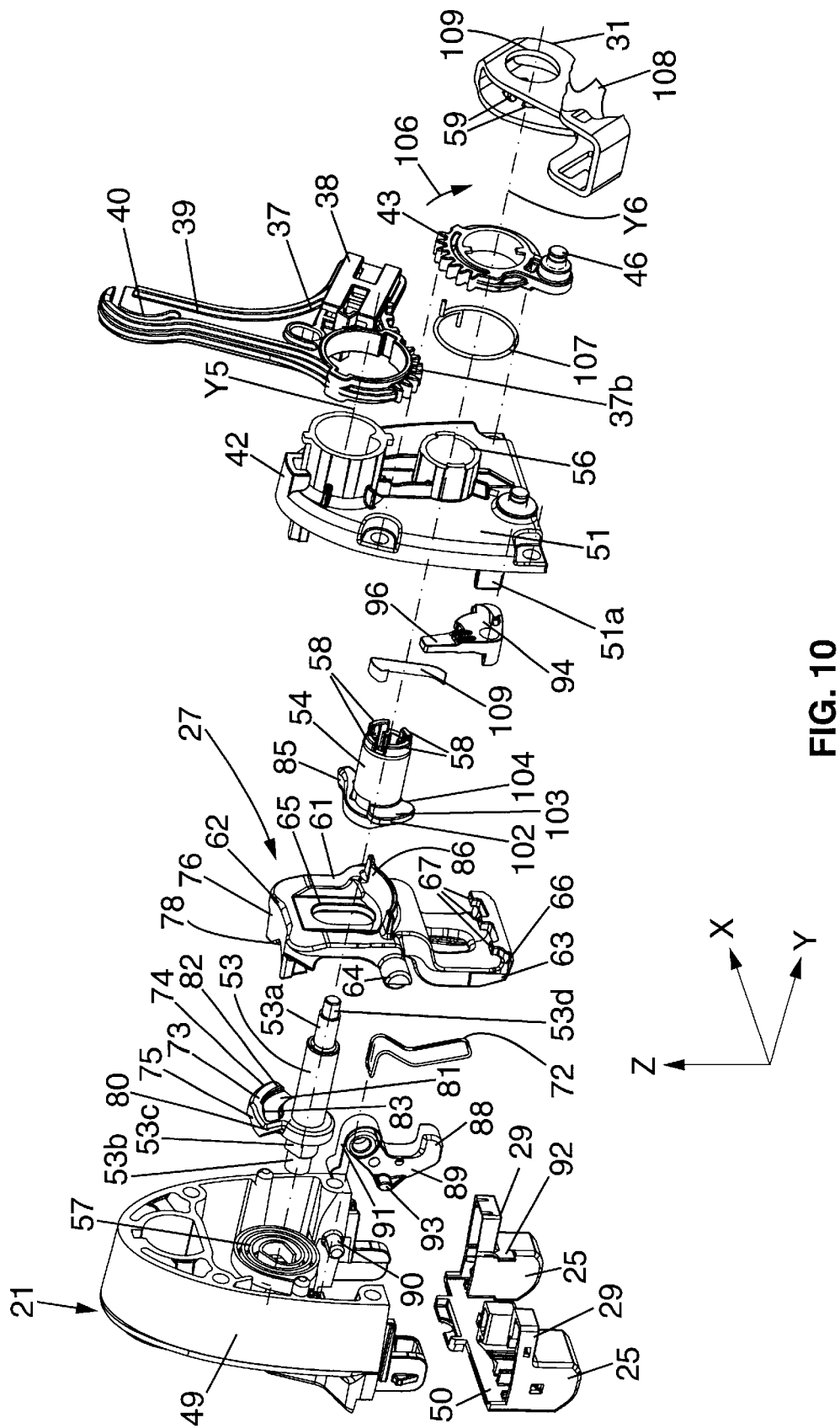
FIG. 10 is an exploded perspective view of the underframe of FIG. 7.
Figure 11:
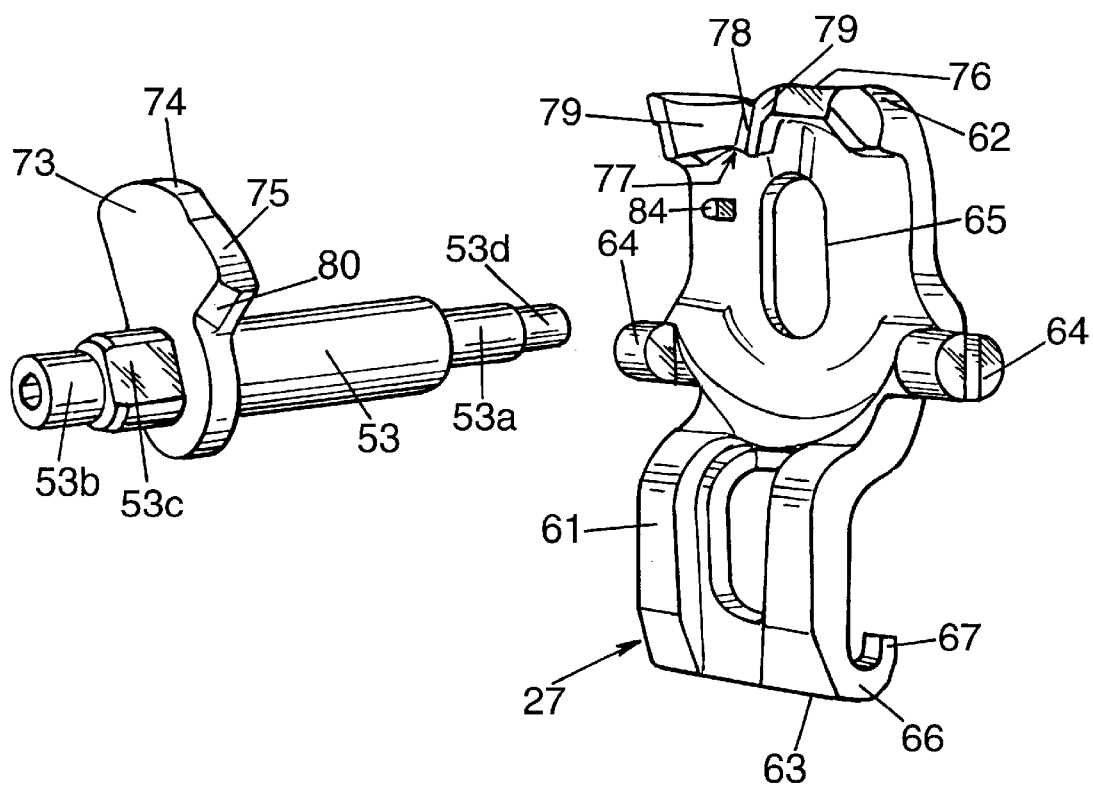
FIG. 11 is a detailed perspective view of two parts belonging to the underframe of FIG. 7.

As can be seen particularly from FIGS. 7, 10 and 11, the locking cam 73 engages under a cam follower 76 formed by a rim of the catch 27 which extends in the transverse direction Y away from the cover 51, at the upper end 62 of the body of the said catch 27.

When the first actuating member 31 is in its first angular position defined hereinabove, the larger-diameter peripheral surface 74 of the locking cam 73 bears under the cam follower 76, between the body 61 and a vertical rim 77 which extends downwards from the free end of the cam follower 76.

As depicted in FIG. 11, the vertical rim 77 has a pointed shape facing towards the body 61 of the catch 27, with a central part 78 which is close to the body 61 and two flared parts 79 which extend at an angle to the body 61 starting from the said central part 78 away from the said body 61.

As a preference, when the first operating member 31 is in its first position, the locking cam 73 bears without play against the central part 78 of the rim 77. This then avoids the catch 27 being able to pivot unintentionally towards its unlocked position in the event of the vehicle being involved in an accident under the effect of the high mechanical forces then transmitted to the seat.

Advantageously, the locking cam 73 also collaborates with the flared parts 79 of the rim 77 to cause the catch 27 to pivot towards its locked position when the first operating member 31 moves from its second angular position to its first angular position.

This cam effect between the flared parts 79 of the rim 77 and the locking cam 73 can be further enhanced by the presence of a chamfer 80 at the edge of the cam which penetrates the first between the central part 78 of the rim 77 and the body 61 of the catch when the first operating member 31 moves from its second angular position to its first angular position. This chamfer 80 bears against one of the flared parts 79 of the rim 77 during this movement.

Furthermore, as depicted in FIG. 10, the locking cam 73 further comprises a slot 81 roughly in the shape of an arc of a circle centred on the axis Y6. This slot 81 has an upper edge which has a first portion 82, of larger diameter, arranged to correspond with the larger-diameter peripheral surface 74 of the locking cam 73, and a second portion 83 of smaller diameter arranged to correspond with the smaller-diameter peripheral surface 75 of the said locking cam 73.

As can be seen in FIGS. 7 and 11, the catch 27 also comprises a peg 84 which projects from the face of the body 61 of this latch which face faces away from the claw 62. This peg 84 is engaged in the slot 81 of the locking cam 73 and forces the catch 27 to move downwards disengaging from the notches 69 of the rail when the first operating member 31 is moved from its first position (locked position) to its third position (sliding position) by then acting under the smaller-diameter edge 82 of the slot 81.

Furthermore, the device for operating the underframe 10 further comprises a pivot cam 85 which is formed of one piece with the hollow shaft 54 and projects radially outwards from this hollow shaft.

This pivot cam 85 collaborates with a cam follower 86 formed by a rim of the body 61 of the catch 27, projecting in the transverse direction Y with respect to the said body 61, under the oblong hole 65 (see FIG. 10).

The pivot cam 85 does not act on its cam follower 86 as long as the first operating member 31 is in an angular position lying between its first and third positions, but the said pivot cam presses against its cam follower 86 as soon as the first operating member 31 is in an angular position lying between its second and third positions, as this causes the catch 27 to pivot about its pivots 64 in the direction of the arrow 87, that is to say moving the claw 66 in such a way that it retracts between the two guide shoes 25 so as to remove the underframe 10 from the rail 9.

Furthermore, as depicted in FIG. 10, each underframe 10 further comprises an abutment claw 88 which is arranged to practically correspond with the claw 66 of the catch 27 and which is carried by a finger 89 mounted to pivot about a pivot 90 belonging for example to the body 49 of the framework of the underframe 10, this pivot 90 running parallel to the longitudinal direction X.

The abutment claw 88 is urged by a leaf spring 91 towards an active position in which the said abutment claw bears against a tab 92 belonging to one of the guide shoes 25. In addition, the finger 89 which bears the abutment claw 88 itself has a tab 93 which projects in the longitudinal direction X passing behind the body 61 of the catch 27 in the lower part of this body 61 on the opposite side to the claw 66.

Thus, when the catch 27 is in the locked position, the abutment claw 88 is in the active position and projects under the rim 68 of the rail 9, but without interfering with this rim, in that the upper face of the abutment claw 88 is slightly below the upper face of the claw 66 of the catch.

Figure 21:
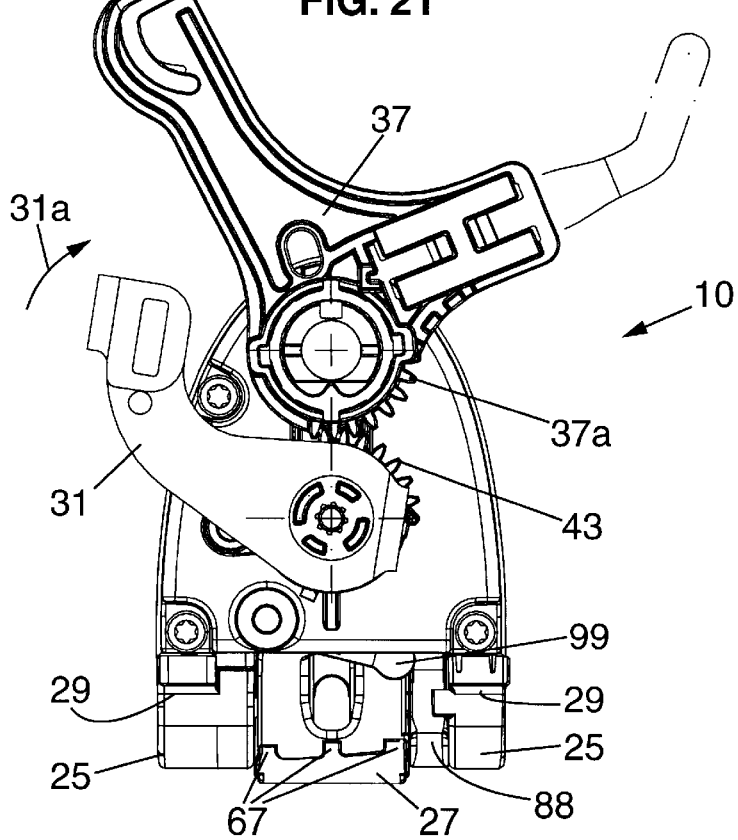

By contrast, when the catch 27 is lowered from its locked position to its sliding position the teeth 67 pass under the upper face of the abutment claw 88 (see FIG. 21). In addition, this abutment claw is wider than the teeth 67 of the claw 66 and than the notches 69 of the rail 9: when the user slides the seat 1 along the rails 9, the abutment claw 80 therefore prevents the teeth 67 from accidentally coming into mesh with the notches 69 while the seat is being slid, particularly when the passenger in the seat is pushing the seat 1 backwards by pressing against the backrest 3, which has a tendency to cause the seat part of the seat to tip backwards slightly and therefore to cause the front end of the seat with the underframes 10 to rise.

Finally, when the catch 27 pivots into its retracted position, it takes with it the abutment claw 88, acting on the tab 93 secured to this claw, so that the abutment claw 88 then comes into an effaced position between the two guide shoes 25 of the underframe 10: thus, the abutment claw 88 does not interfere with the rail 9 but allows the underframe 10 to be removed from the rail 9.

Figure 12:
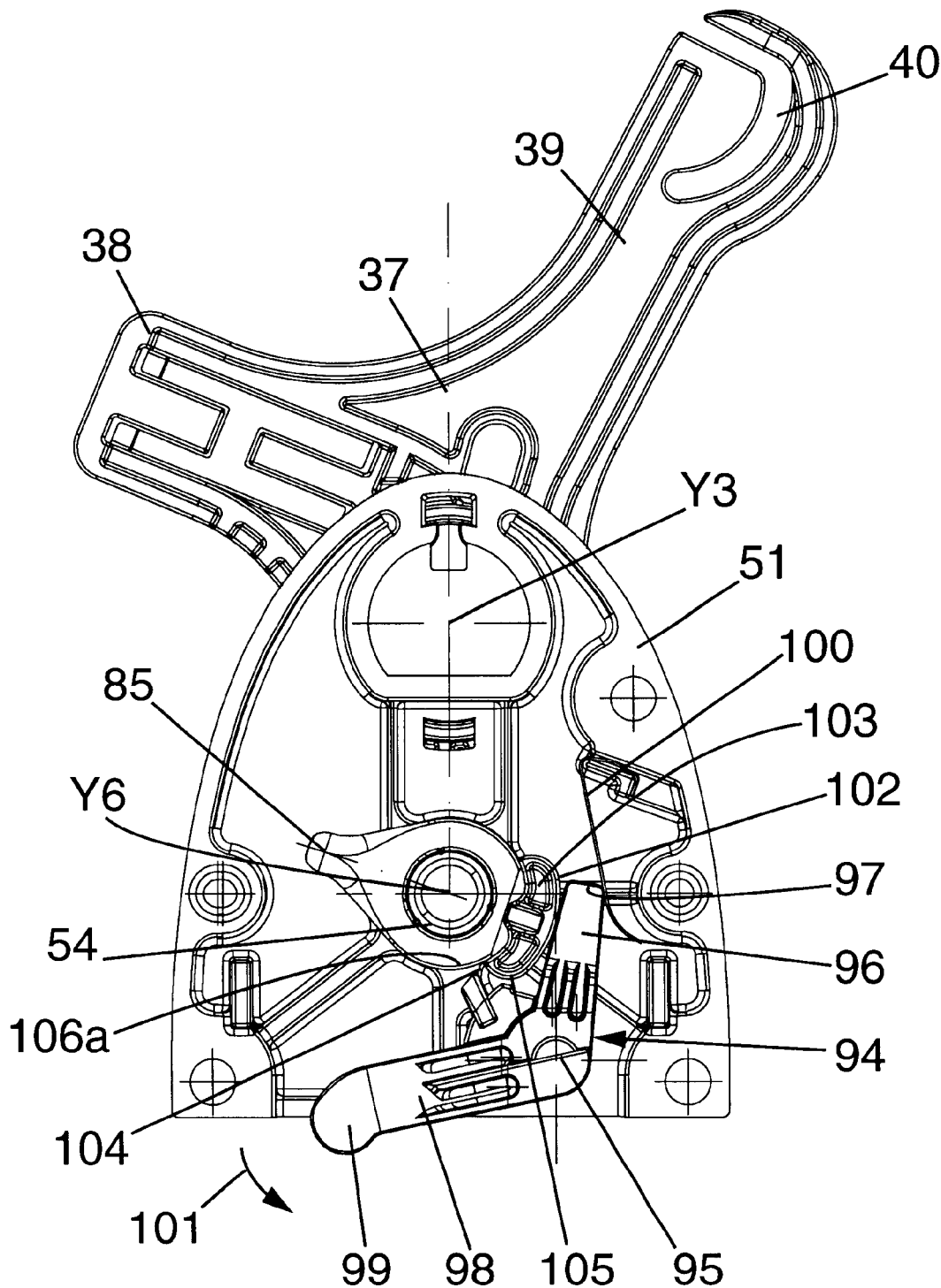
FIG. 12 is an elevation of part of the operating device situated inside the underframe of FIG. 7.
Figure 13:
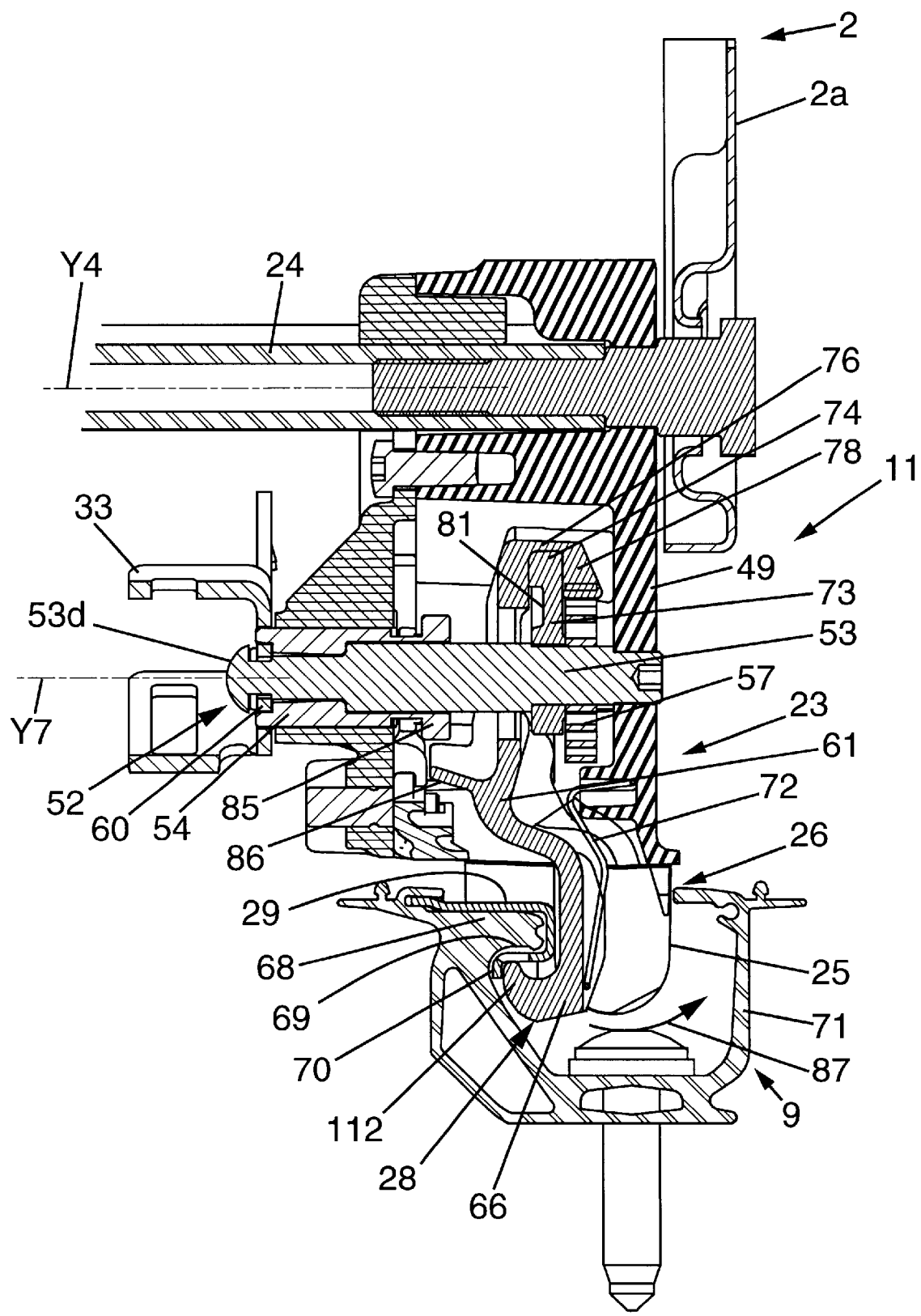
FIG. 13 is a view in vertical cross section of the rear left-hand underframe of the seat of FIG. 1, locked onto its rail.
Figure 14:
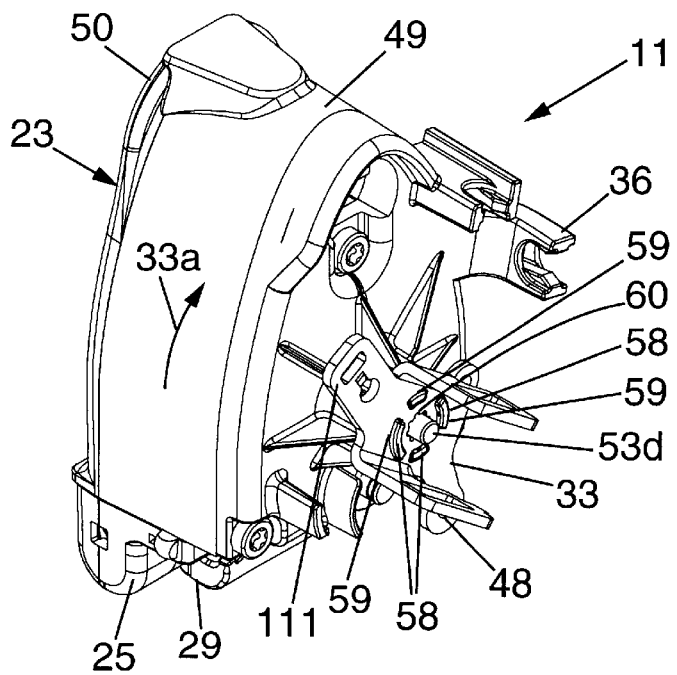
FIGS. 14 to 17 are views similar to FIGS. 8 to 10 and 12, in respect of the rear left-hand underframe.
Figure 15:
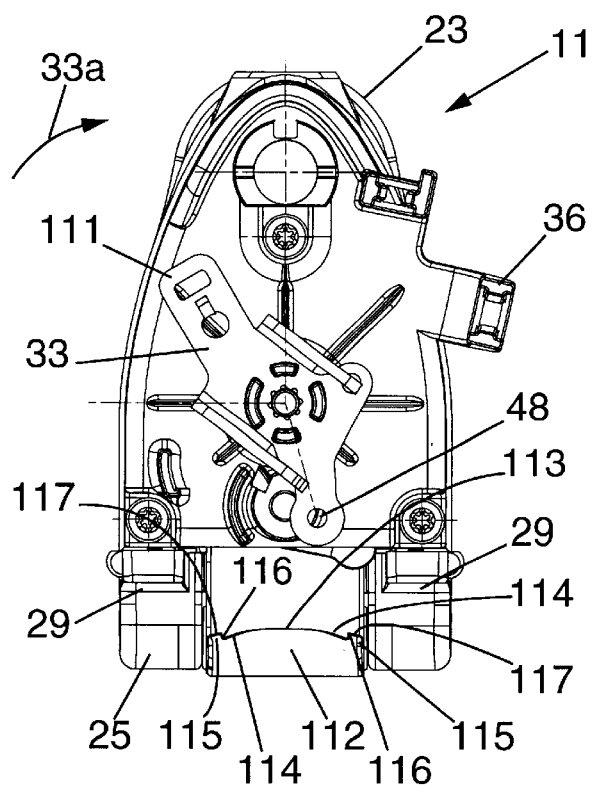
Figure 16:
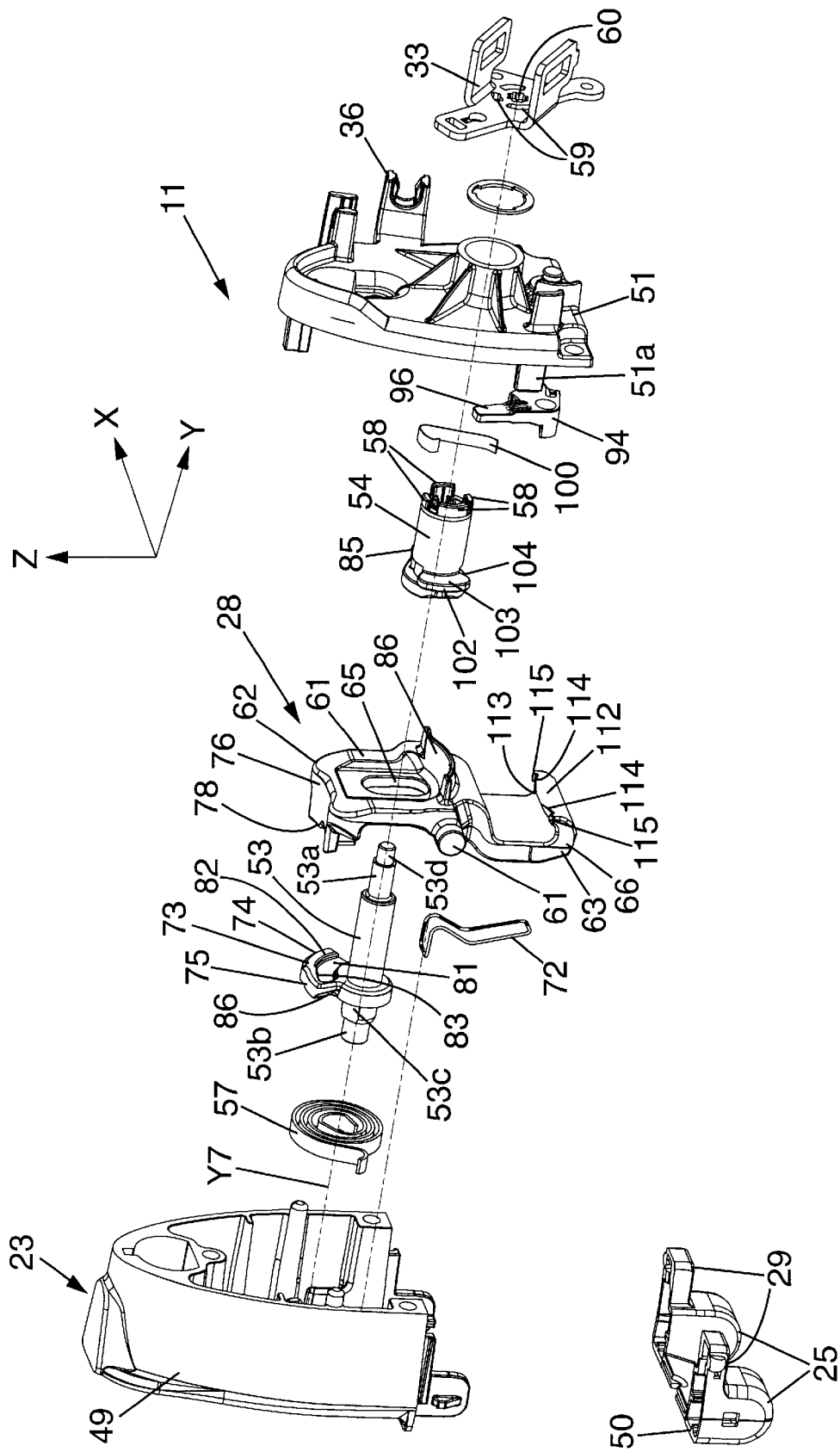
Figure 17:
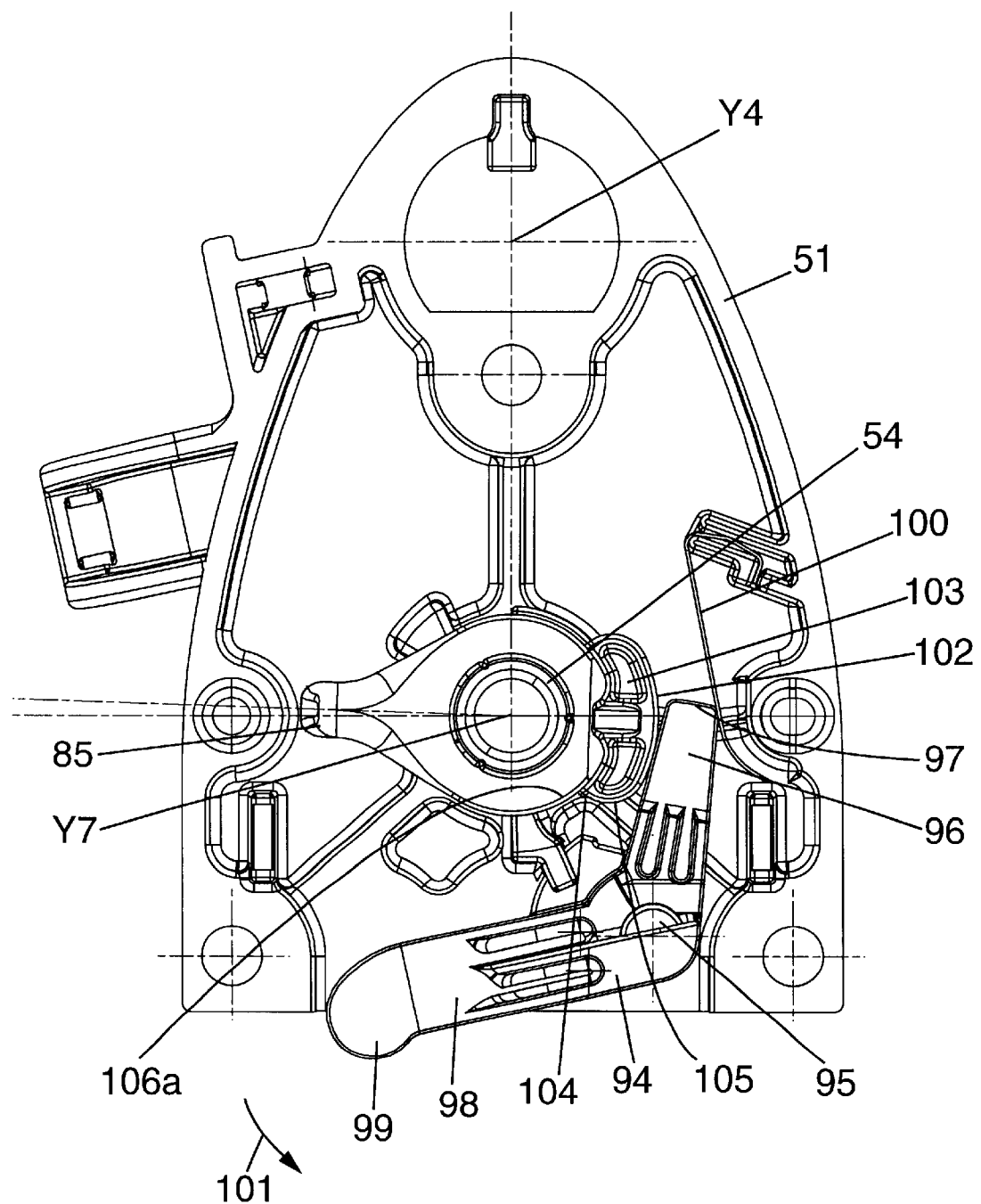

Moreover, as can be seen in FIGS. 10 and 12, the operating device of the underframe 10 also comprises a release finger 94 which is mounted to pivot on the internal face of the cover 51, about a pivot 95 which runs parallel to the transverse direction Y.

The release finger 94 has a first branch 96 which extends upwards from the pivot 95 as far as a free end 97, and a second branch 98 which extends at an angle downwards and forwards (or downwards and backwards) as far as a free end 99, the second branch 98 being inclined slightly with respect to the horizontal when the release finger is in the rest position.

The release finger 94 is elastically urged by a leaf spring 100 in the direction of the arrow 101 (FIG. 12), and as long as the first operating member 31 is in its first position, the said spring 100 keeps the first branch 96 of the release finger bearing against a cam surface 102 belonging to a release cam 103 which may for example be formed of one piece with the hollow shaft 54.

The cam surface 102 has a shape roughly in an arc of a circle centred on the axis Y6 and at one of its ends has an abutment face 104 arranged roughly radially with respect to the axis Y6, this abutment face joining the cam surface 102 via a rounded portion 105.

Thus, when the first actuating member is in its second angular position and the underframe 10 separated from the rail 9, the first branch 96 of the release finger bears against an abutment zone 106a belonging to the hollow shaft 54 under the action of the leaf spring 100. The free end 97 of the first branch 96 of the release finger finds itself then in abutment against the abutment face 104 of the release cam 103 and the release finger 94 is in an active position in which its free end 99 projects downwards beyond the sliding shoes 29.

Thus, the first operating member 31 remains immobilized in the second angular position and the catch 27 remains in the retracted position until the underframe 10 is once again returned to its rail 9, in which case the free end 99 of the second branch of the release finger presses on the said rail 9, and this returns the release finger 94 to its initial effaced position, allowing the first actuating member 31 to return to its first position and allowing the catch 27 to return to the locked position.

It will be noted that this return movement of the release finger is facilitated by the rounded portion 105 of the end of the release cam 103, which pushes the free end 97 of the first branch of the release finger back towards its retracted position under the action of the spring 57 as soon as the said free end no longer corresponds to the abutment face 104.

Finally, as depicted in FIG. 10, the pinion 46 is mounted free to rotate about the bearing 56 and is urged elastically in the angular direction 106 by a flat spiral spring 107 so that the peg 46 of the pinion 43 comes automatically into abutment against a tab 108 belonging to the first operating member 91. Thus, when the second operating member 37 is actuated in the previously mentioned angular direction 37a, the teeth 37b of the second operating member drives the pinion 43 in the opposite direction to the direction 106 and the peg 47 of the pinion drives the first operating member 31 by acting on the tab 108.

Conversely, when the first operating member 31 is actuated to move from its first to its second position, the second lever arm 39 of the second operating member 37 comes into abutment against the abutment 42 as soon as the first operating member 31 reaches its third angular position intermediate between the first and second positions then the second operating member 37 and the pinion 43 remain immobile while the first operating member 31 continues its movement.

It will be noted that during the process of manufacturing the underframe 10 (and also, incidentally, of the underframe 11 which will be described hereinafter), the inner metal shaft 53 is initially left free to rotate inside the notched hole 60 of the first operating member 31 and of the hollow outer shaft 54 so that the said inner shaft 53 and the locking cam 73 initially find their rest position under the action of the spring 57, for example by imposing a predetermined position on the claw 66 with respect to the framework 21 of the underframe. By way of example, this predetermined position can be obtained by inserting a block (not depicted) between the sliding shoes 29 and the claw 66 of the catch 27.

Once the inner shaft 53 has been positioned, this shaft is crimped into the notched hole 60 of the first operating member 31 imposing a certain orientation on the operating member 31. This crimping is performed for example by heading, that is to say by flow turning, to the hole 109 of the said first operating member 31.

The rear underframes 11 of the seat 1 are similar to the front underframes 10 and will not therefore be described in detail hereinafter.

Each of these rear underframes 11, of which the rear left-hand underframe has been depicted in FIGS. 13 to 17, differs from the front underframes 10 in the following respects:

the operating member 33 has a different shape from the first operating member 31 of the front underframes, the actuating member 52 consisting of the inner metal shaft 53 and the outer shaft 54 made of plastic being fixed to the operating member 33 in the same way as this member is fixed to the first operating member 31 in the case of the front underframes 10, the rear underframes 11 do not have a second operating member 37 or pinion 43, the rear underframes 11 do not have an abutment claw 88, and the catches 28 of the rear underframes are similar to the catches 27 described hereinabove except that the free end of their catching claw 66 does not end in teeth 67 projecting upwards but only in a rim 112 projecting upwards, this rim having a horizontal upper edge 113 which extends in the longitudinal direction X between two inclined ends 114 extending downwards one opposite the other at the front and rear ends of the claw 66, each of the front and rear ends of the claw being provided with a catching tooth 115 which, on the one hand, has a roughly vertical stop face directed towards the said upper edge 113 and, on the other hand, has an upper face 117 which is inclined at an angle downwards and towards the corresponding end of the claw.

Thus, the catches 28 of the rear underframes do not come into mesh with the notches 69 of the rail under normal conditions of use, but the catching teeth 115 may, as necessary, catch into the notches 69 or into another part of the rail 9 if the seat 1 is heavily stressed, for example in the event of the vehicle being involved in an accident, and this strengthens the attachment of the seat to the rails.

In order to cause the catches 27, 28 of all the underframes to move into their sliding position, the operating members 33 of the rear underframes are operated either by the operating linkage 44 described earlier when actuating the second operating member 37, or by means of the cable 35, the second end 35a of which is fixed to the end 118a of an operating finger 118 which is mounted to pivot on one of the side plates 4a that forms the lower part 4 of the backrest, about an axis of rotation Y8 parallel to the transverse direction Y (see FIG. 18).

The operating finger 118 is mounted on the side plate 4a by means of a pivot 119 and is urged against the side plate 4a by a leaf spring 120, the operating finger 118 however having a certain amount of play with respect to the pivot 119 so that its free end 118a can separate slightly from the said side plate 4a. In addition, the operating finger 118 is made to rotate downwards by a flat spiral spring 124 which tends to hold the said operating finger in a rest position, for example in abutment against a relief (not depicted) belonging to the side plate 4a.

Furthermore, the corresponding side plate 5a of the upper part of the backrest comprises a projecting peg 121 which passes through a slot 122 in the shape of an arc of a circle formed in the side face 4a and centred on the axis Y2. The peg 121 normally bears against the lower edge 118b of the operating finger 118.

When the seat is in the normal position of use, this peg 121 is engaged in a cut-out 7a formed in the lever integral with the handle 7, to prevent the upper part 5 of the backrest from tipping forwards. When the handle 7 is actuated, it releases the peg 121 and the upper part 5 of the backrest can pivot forward.

The upper end of the slot 122, in which the peg 121 slides, has, on one of its edges, a ramp 124 which is designed to move the free end 118a of the operating finger away from the side plate 4a when the said operating finger pivots upwards under the action of the peg 121 when the upper part 5 of the backrest more or less reaches its position in which it is folded over parallel to the seat part.

Furthermore, as can be seen in FIGS. 19 and 20, the face of the operating finger 118 which normally faces towards the side plate 4a has a ramp 125 facing the slot 122.

This ramp 125 runs at an angle away from the side plate 4a from the lower edge 118b towards the upper edge 118c of the operating finger, as can be seen in FIGS. 19 and 20, and the said ramp 125 is designed so that the peg 121 can engage under the said ramp when the upper part 5 of the backrest is lifted up backwards from its folded-down position, as will be explained hereinafter.

Now that the structure of the seat has been described in full, it will be possible for its operation to be described in greater detail.

Figure 22:
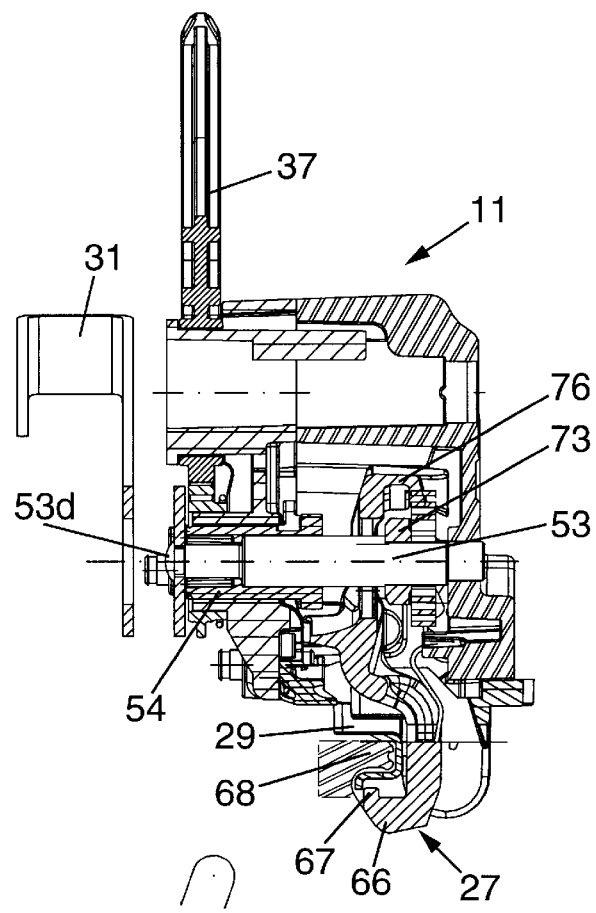
Figure 23:
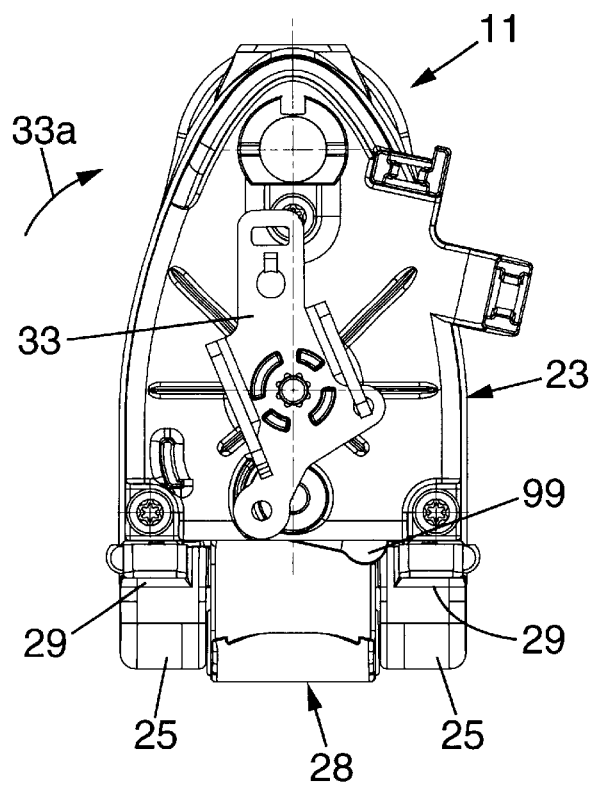
FIGS. 23 and 24 are views similar respectively to FIGS. 15 and 13, in the sliding position of the rear left-hand underframe.
Figure 24:
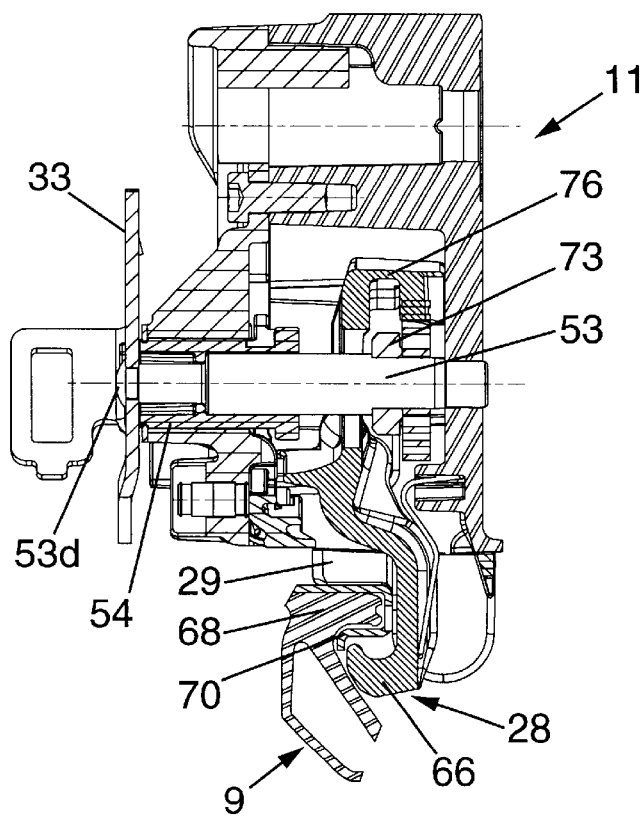

Starting out from the normal position of use, when a user of the vehicle wishes to adjust the longitudinal position of the seat by sliding it forwards or backwards, he actuates the balance beam 12 or the handle 13, which acts on the second operating member 37 of the front underframes 10 by causing it to pivot until it reaches abutment in the direction 37a (FIGS. 21 and 22) so that, as already explained hereinabove, the first operating members 31 of the front underframes pivot from their first angular position to their third angular position and so that the operating linkage 44 drives the first operating members 33 of the rear underframes also from their first angular position to their third angular position (FIGS. 23 and 24).

Thus, the catches 27, 28 of the four underframes 10, 11 of the seat are in their sliding position in which the claws 66 of these catches no longer bear under the rims 68 of the rails 9 and in which the teeth 67 of the front catches 27 are no longer in mesh in the notches 69 but in which the said claws 66 remain in a position projecting under these rims 68 (FIGS. 22 and 24). The seat 1 can therefore slide forwards or backwards along the rails 9 in the longitudinal direction X but the underframes 10, 11 cannot be separated from the rails 9.

In contrast, when a user wishes to place the seat in the folded-up position, as depicted in FIG. 25, that is to say with the upper part 5 of the backrest arranged roughly parallel to the seat part 2 and with the seat part 2 lifted up, he actuates the handle 7, which unlocks the upper part 5 of the backrest and allows it to tip forwards.

Figure 26:
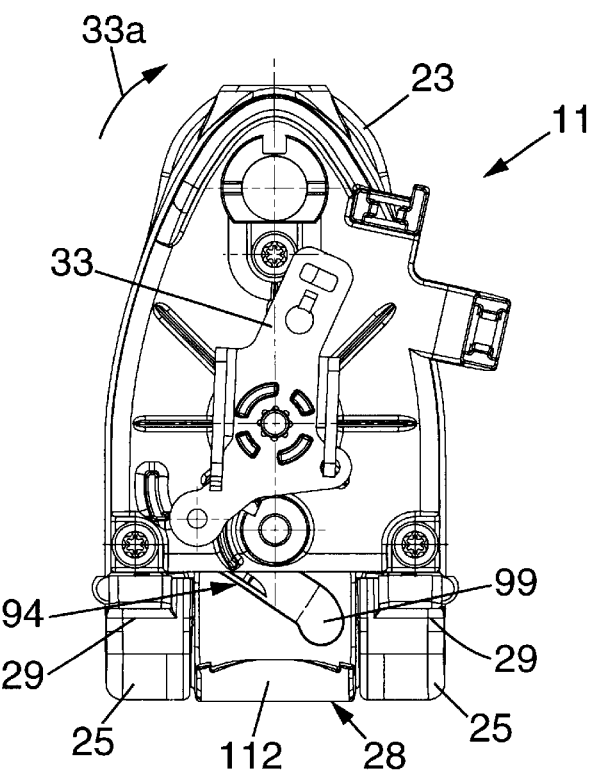
FIGS. 26 to 28 are views similar respectively to FIGS. 15, 13 and 17, showing the rear left-hand underframe with its catch in the retracted position.
Figure 27:
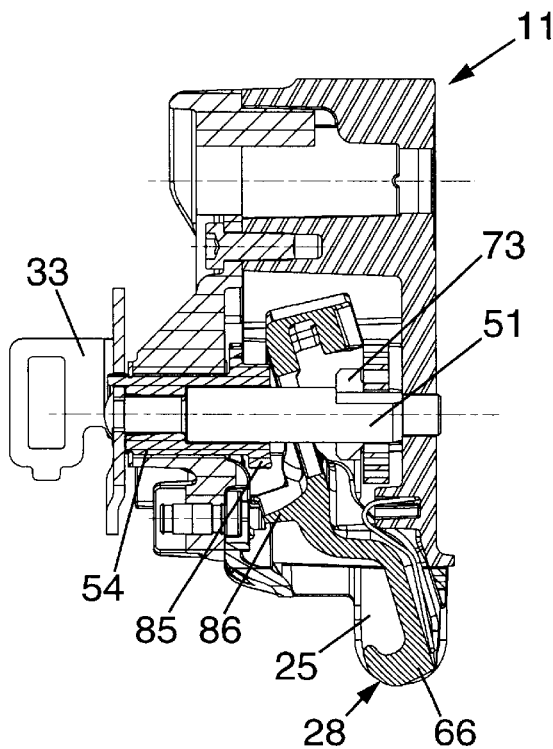
Figure 28:
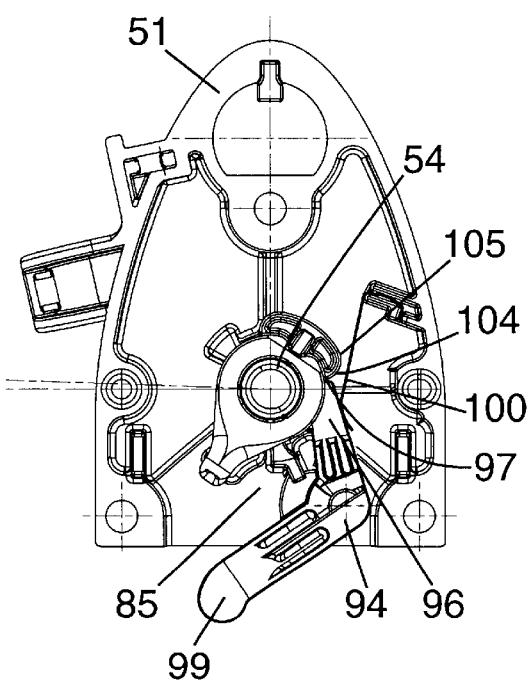

During this movement, the peg 121 is first of all bearing under the lower edge 118b of the operating finger 118 (see FIG. 2), so that the operating finger 118 pivots upwards and pulls on the sheathed cable 35 which actuates the operating members 33 of the rear underframes and thus places the catches 28 of the rear underframes in their retracted position (see FIGS. 26 to 28).

At the same time, the lifting arms 18 lift the seat part 2 of the seat by causing it to pivot about the axis Y3 of the front underframes. As soon as the seat part 2 has begun to pivot about the axis Y3, the release fingers 94 of the rear underframes move to their active position and immobilize the catches 28 of the rear underframes in their retracted position.

In addition, as already explained earlier, the rear underframes 11 then retract up inside the seat part 2 under the effect of the linkrods 14.

In the position depicted in FIG. 25, the peg 48 of the first operating member 33 of the rear right-hand underframe finds itself back at the front end of the slot 47 of the operating linkage 44, just as the peg 46 which is secured to the pinion 43 of the front right-hand underframe finds itself back at the front end of the slot 45 of the operating linkage 44.

Furthermore, as can be seen in FIG. 29, at the end of the movement of folding over the upper part 5 of the backrest, the ramp 125 of the operating finger 118 is lifted by the ramp 123 of the side plate 4a, which means that the operating finger 118 can pass over the peg 121 under the action of the spring 124 in the direction of the arrow 127. Thus, as soon as the backrest 5 is in the folded flat position, parallel to the seat part 2, the cable 35 ceases to urge the operating member 33 of the rear underframes but this operating member 33 remains in its second angular position corresponding to the position in which the rear catches 28 are retracted because the operating device of the rear underframes is then immobilized by the release fingers 94 of the said rear underframes.

Starting out from the position depicted in FIG. 25, the user may possibly fold the rear part of the seat part downwards, in which case the free ends 99 of the release fingers of the rear underframes come to bear on the rails 9 as soon as the guide shoes 25 of the rear underframes have engaged in the slots of the said rails, and this releases the operating devices of the said rear underframes and allows the rear catches 28 to return to their locked position. Once the seat has been returned to this position in which the four underframes 10, 11 are locked onto the rails 9, the user may possibly leave the upper part 5 of the backrest folded down flat like a table, horizontally, or alternatively may stand this upper part 5 up.

If such is the case, as depicted in FIG. 30, then the operating finger 118 remains in its angular rest position and the peg 121 moves in the direction of the arrow 127, passing under the ramp 125 of the operating finger and lifting the free end 118a of the said operating finger until the said peg 121 has reached the level of the lower edge 118b of the operating finger, after which the leaf spring 120 folds the operating finger 118 down against the side plate 4a.

Thus, in standing or lifting up the backrest, the catches 28 of the rear underframes are not actuated and remain in the locked position.

Finally, starting out from the position depicted in FIG. 25, the user may, as appropriate, also detach the front underframes 10 from the rails 9 so as to remove the seat 1. In this case, the user raises the connecting bar 26 in such a way as to actuate the first operating members 31 of the front underframes 10 in the direction 31a visible in FIG. 4 until such time as the said first operating members reach their second angular position.

Figure 32:
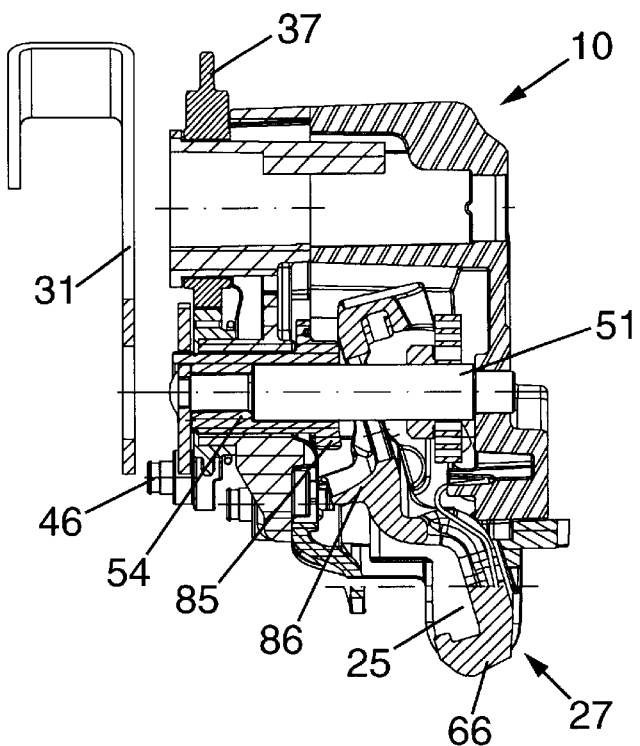
FIGS. 31 and 32 are views similar respectively to FIGS. 9 and 7, showing the front left-hand underframe with its catch in the retracted position.
Figure 31:
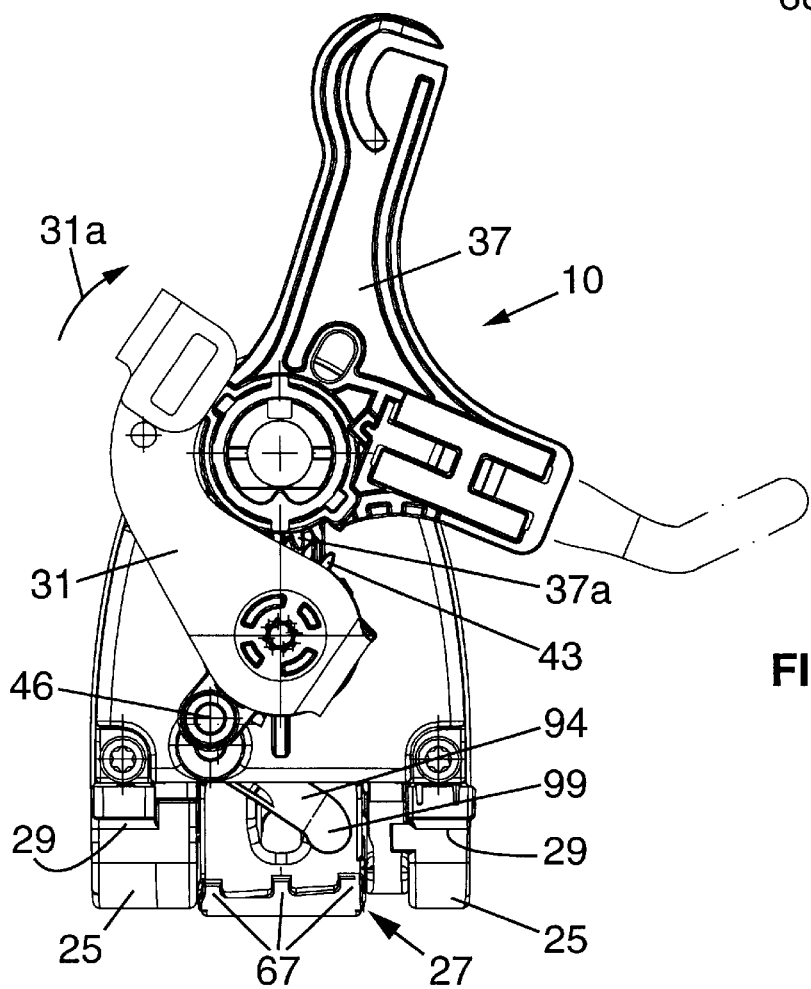

As depicted in FIGS. 31 and 32, the catches 27 of the front underframes are then in their retracted position, and this allows the front underframes 10 to be removed from the rails 9. As soon as the front underframes 10 are no longer in contact with the rails 9, the release fingers 94 return to their active position and immobilize the catches 27 in their retracted position.

Subsequently, when the user wishes to lock the front underframes 10 of the seat back into the rails 9, all he has to do is engage the guide shoes 25 of these underframes in the slots in the rails, so that the free ends 99 of the release fingers 94 come to bear against the rails and pivot into their rest position, which releases the operating devices of the front underframes and allows the catch 27 of these underframes to lock into the rails 9. The user can then fold down the rear end of the seat part then lift up the upper part 5 of the backrest, also as explained hereinabove.

We claim:

1. Vehicle seat underframe comprising: a rigid framework intended to be fixed to a seat part of a seat and to be mounted to slide in a longitudinal direction on a horizontal rail fixed to the floor of a vehicle, the framework comprising at least one lower guide shoe which projects downwards and which is intended to engage with a longitudinal guide belonging to the rail, at least one moving catch which comprises a rigid body stretching between an upper end and a lower end, the lower end of the body of the catch being extended laterally by a projecting claw which extends at the level of the guide shoe in a transverse horizontal direction perpendicular to the longitudinal direction, the catch being movable with respect to the rigid framework between at least two positions: a locked position in which the claw of the catch projects laterally with respect to the guide shoe in the transverse direction, the claw of the catch then being intended to engage under a rim exhibited by the rail in such a way as thus to prevent the seat from being removed from the rail, the catch being urged elastically towards the locked position, and a retracted position in which the claw is moved towards the guide shoe with respect to the locked position, the claw then being intended no longer to interfere with the rim of the rail and thus to allow the underframe to be removed from the rail, and an operating device designed to move the catch at least between the locked position and the retracted position, the operating device comprising at least one actuating member which is movable between first and second positions corresponding respectively to the locked position and to the retracted position of the catch, wherein the operating device further comprises a release finger constituting a separate part from the catch, the release finger being mounted to pivot with respect to the framework of the underframe about a release finger pivot, the release finger comprising a first branch which extends from the release finger pivot as far as a free end and a second branch which extends from the release finger pivot as far as a free end, the release finger being movable between: an effaced position in which the second branch of the release finger is designed to be raised enough for the second branch not to interfere appreciably with the rail on which the underframe is intended to be mounted, and an active position in which the free end of the second branch projects downwards from the framework of the underframe so that when the guide shoe of the underframe is engaged with the longitudinal guide of the rail, the rail lifts the free end of the second branch of the release finger and returns the release finger to the effaced position, the release finger being urged elastically towards the active position, wherein when the release finger is in the effaced position, the first branch of the release finger is designed to bear against a cam surface belonging to a release cam connected to the actuating member, as long as the actuating member is not in the second position, then holding the release finger in the effaced position, and wherein the release finger is designed so that when the release finger is in the active position, the free end of the first branch of the release finger comes into abutment against an abutment face integral with the release cam, thus holding the actuating member of the operating device in the second position.

2. Seat underframe according to claim 1, in which the abutment face of the release cam is connected by a rounded portion to the cam surface of the release cam, and the actuating member is urged elastically towards the first position by at least one spring which is powerful enough that when the free end of the first branch of the release finger comes into contact with the rounded portion in the absence of external actuation of the actuating member, the spring urging the actuating member drives the actuating member with the release cam into the first position and brings the cam surface of the release cam into contact with the first branch of the release finger.

3. Seat underframe according to claim 1, in which the second branch of the release finger extends at an angle in the longitudinal direction and downwards at least when the release finger is in the active position.

4. Underframe according to claim 1, in which the framework of the underframe comprises two horizontal sliding shoes oriented downwards and intended to bear on a sliding surface belonging to the rail, the free end of the second branch of the release finger projecting downwards beyond the sliding shoes when the release finger is in the active position, between the sliding shoes.

5. Seat underframe according to claim 1, in which the release cam is integral with an abutment zone against which the first branch of the release finger angularly abuts when the release finger is in the active position.

6. Seat underframe according to claim 1, in which the release cam is integral with the actuating member, which is mounted to pivot about a first axis of rotation parallel to the transverse direction.

7. Seat underframe according to claim 6, in which the release cam is integral with a pivot cam which collaborates with a first cam follower integral with the catch, the pivot cam being designed to press against the first cam follower by causing the catch to pivot about a pivot axle parallel to the longitudinal direction, from the locked position to the retracted position when the actuating member passes from the first position to the second position, the catch being urged in the opposite direction by a catch spring.

8. Seat underframe according to claim 7, in which the first cam follower of the catch has an upper bearing surface against which the pivot cam bears to cause the catch to pivot, the upper bearing surface being laterally offset with respect to the rotation axle of the catch.

9. Seat underframe according to claim 7, in which the actuating member is secured to a locking cam and the catch is mounted to pivot on the framework of the underframe with a certain vertical play, between the locked position and a sliding position situated below the locked position, the locking cam coming to bear under a second cam follower situated towards the upper end of the body of the catch so as to hold the catch in the locked position as long as the actuating member is in an angular position lying between the first position and a third position intermediate between the first and second positions, and the locking cam being designed to allow the catch to drop into the sliding position when the actuating member is in an angular position lying between the third and second positions.

10. Seat underframe according to claim 9, in which the locking cam is in the form of a rigid platelet stretching in a vertical plane roughly parallel to the body of the catch, the locking cam comprising a slot in which there is engaged a peg integral with the catch, the slot being shaped to press against the peg and cause the catch to drop into the sliding position when the actuating member is in the third position.

11. Seat underframe according to claim 9, in which the second cam follower of the catch comprises a rim stretching downwards, the locking cam penetrating between the rim and the body of the catch at least when the catch is in the locked position.

12. Seat underframe according to claim 9, in which the locking cam is in contact with the rim of the second cam follower, without clearance, when the catch is in the locked position.

13. Seat underframe according to claim 12, in which the rim of the second cam follower and the locking cam are shaped to collaborate with one another via a cam effect so as to cause the catch to pivot from the retracted position into the sliding position when the actuating member pivots from the second angular position to the third angular position.

14. Seat underframe according to claim 13, in which the locking cam has a chamfer which collaborates with an angled interior face belonging to the rim of the second cam follower so as to move the catch from the retracted position to the sliding position when the actuating member pivots from the second angular position to the third angular position.

15. Seat underframe according to claim 9, in which the actuating member comprises a metal shaft which is integral with the locking cam, the release cam and pivot cam being integral with a hollow shaft which is fitted over the metal shaft and which is not connected in terms of rotation directly to the metal shaft, the hollow shaft having end tabs which collaborate by fitting-together with a first operating member that can be actuated by a user, immobilizing the hollow shaft in terms of rotation with respect to the first operating member, the first operating member having a notched hole into which a free end belonging to the metal shaft penetrates, the free end being crimped into the notched hole, thereby securing the first operating member to the metal shaft.

16. Seat underframe according to claim 9, in which the actuating member is integral with a first operating member that can be actuated by a user, which allows the actuating member to be moved between the first and second positions, the actuating member also being mechanically connected to a pinion which is in mesh with a ring of teeth secured to a second operating member that can be actuated by a user, the second operating member being movable in rotation about a second axis of rotation parallel to the first axis of rotation between a rest position and an abutment position corresponding respectively to the first and third positions of the actuating member, the second operating member coming into contact with an abutment integral with the framework of the underframe when the second actuating member is in the abutment position, and the pinion being connected, with a certain amount of backlash, to the actuating member, so that the actuating member can pivot from the third to the second position in a first angular direction while the second operating member remains bearing against the corresponding abutment integral with the framework of the underframe.

17. Seat underframe according to claim 16, in which the pinion is urged elastically in the first angular direction so as normally to be kept bearing angularly against an abutment integral with the actuating member.

18. Seat underframe according to claim 1, in which the claw of the catch has a free end provided with teeth which project upwards and which are aligned in the longitudinal direction.

19. Seat underframe according to claim 18, in which there are at least three teeth on the catch, the claw of the catch stretching between a front end and a rear end, and the teeth of the claw having heights which decrease from the front end towards the rear end of the claw.

20. Seat underframe according to claim 18, in which the catch is movable downwards from the locked position into a sliding position, the underframe further comprising an abutment claw which is mounted to pivot with respect to the framework of the underframe between an active position and an effaced position, the abutment claw projecting laterally with respect to the guide shoe parallel to the claw of the catch when the abutment claw is in the active position, the abutment claw also being shaped to have an upper surface situated above the upper ends of all the teeth of the catch when the catch is in the sliding position, the abutment claw being urged elastically towards the active position in which it butts angularly against an abutment member integral with the framework of the underframe, and the abutment claw comprising a part which projects in the longitudinal direction against a face of the body of the catch situated on the opposite side to the claw of the catch, so that the catch drives the abutment claw from the active position into the effaced position when the catch moves from the sliding position to the retracted position.

21. Seat underframe according to claim 20, in which the abutment claw is shaped not to extend laterally beyond the claw of the catch at least when the catch is in the retracted position.

22. Seat underframe according to claim 20, in which the framework of the underframe comprises an additional guide shoe aligned with the guide shoe in the longitudinal direction, the catch and the abutment claw being arranged between the two guide shoes and being designed to lie roughly in line with the guide shoes when the catch is in the retracted position.

23. Seat underframe according to claim 1, in which the claw of the catch has a free end extended upwards by a rim which has a horizontal upper edge running in the longitudinal direction between two inclined ends which extend downwards one opposite the other at the front and rear ends of the claw, each of the front and rear ends of the claw being provided with a catching tooth which has a vertical stop face facing towards the rim and an upper face arranged at an angle downwards and towards the corresponding end of the claw.

24. Vehicle seat comprising a backrest and a seat part mounted on two front underframes and two rear underframes according to claim 1.

25. Seat according to claim 24, in which the actuating members of the two front underframes are joined together and the actuating members of the two rear underframes are joined together, the actuating members of the front underframes and of the rear underframes being joined together by an operating linkage.

26. Seat according to claim 25, in which the linkage is connected with play to the actuating members of the front and rear underframes, the play being chosen so that movement of the actuating members of the front underframes from the first to the second position gives rise to an identical movement of the actuating members of the rear underframes, whereas movement of the actuating members of the rear underframes from the first to the second position does not give rise to movement of the actuating members of the front underframes.

27. Seat according to claim 26, comprising front underframes according to either one of claims 16 and 17 and rear underframes the actuating member of which is secured to an operating member, in which the operating linkage is connected to the operating member of one of the rear underframes and to the pinion of the corresponding front underframe.

28. Vehicle seat assembly comprising a seat according to claim 24 and two parallel rails running in the longitudinal direction and each provided with a guide against which the guide shoes of the underframes slide and with a rim under which the claws of the catches of the underframes engage.

* * * * *